US012367822B2

(12) United States Patent
Kim et al.

(10) Patent No.: US 12,367,822 B2
(45) Date of Patent: Jul. 22, 2025

(54) DISPLAY DEVICE

(71) Applicant: Samsung Display Co., Ltd., Yongin-Si (KR)

(72) Inventors: Hyojung Kim, Yongin-si (KR); Yoo-Young Park, Yongin-si (KR); Jimyoung Seo, Yongin-si (KR); Ji-Hyeon Son, Yongin-si (KR); Seungbo Shim, Yongin-si (KR); Jeong Yong Lee, Yongin-si (KR); Hyesun Sung, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/595,433

(22) Filed: Mar. 5, 2024

(65) Prior Publication Data

US 2024/0346999 A1 Oct. 17, 2024

(30) Foreign Application Priority Data

Apr. 12, 2023 (KR) ........................ 10-2023-0048014

(51) Int. Cl.
*G09G 3/3225* (2016.01)
*G09G 3/3266* (2016.01)

(52) U.S. Cl.
CPC ......... *G09G 3/3225* (2013.01); *G09G 3/3266* (2013.01); *G09G 2300/0819* (2013.01);
(Continued)

(58) Field of Classification Search
CPC ... G09G 3/3266; G09G 3/3225; G09G 3/3233
See application file for complete search history.

(56) References Cited

U.S. PATENT DOCUMENTS 8,054,279 B2 11/2011 Umezaki et al.
8,164,555 B2 4/2012 Miyake et al.
(Continued)

FOREIGN PATENT DOCUMENTS

JP 6263752 B2 1/2018
KR 10-1362952 B1 2/2014
(Continued)

OTHER PUBLICATIONS

Jae Kyeong Jeong, "Photo-bias instability of metal oxide thin film transistors for advanced active matrix displays" Journal of Materials Research, vol. 28, Issue 16, Aug. 28, 2013, pp. 2071-2084.

*Primary Examiner* — Kevin M Nguyen
(74) *Attorney, Agent, or Firm* — Innovation Counsel LLP

(57) ABSTRACT

A display device is disclosed that includes a pixel circuit, a light emitting element, and a driving circuit. The pixel circuit includes a plurality of pixel transistors. The light emitting element is electrically connected to the pixel circuit. The driving circuit is configured to provide a prescribed signal to the pixel circuit and includes a plurality of driving transistors. A gate signal is applied to a gate of at least one transistor among the plurality of pixel transistors and the plurality of driving transistors. The gate signal includes a first interval in which a DC signal is applied and a second interval in which an AC signal is applied. The second interval includes a first sub-interval in which a first voltage is applied and a second sub-interval in which a second voltage different from the first voltage is applied. The first voltage is a negative voltage and the second voltage is a positive voltage or about 0 V.

20 Claims, 18 Drawing Sheets

(52) U.S. Cl.
CPC ............... *G09G 2300/0852* (2013.01); *G09G 2300/0861* (2013.01); *G09G 2310/08* (2013.01); *G09G 2320/045* (2013.01)

(56) References Cited

U.S. PATENT DOCUMENTS

| | | | | |
|---|---|---|---|---|
| 9,183,780 | B2 | 11/2015 | Kim et al. | |
| 9,276,123 | B2 | 3/2016 | Wakana et al. | |
| 9,349,964 | B2 | 5/2016 | Chun et al. | |
| 9,825,058 | B2 | 11/2017 | Jang et al. | |
| 10,002,568 | B2 | 6/2018 | Izumi et al. | |
| 2016/0125803 | A1* | 5/2016 | Qing | G09G 3/3233 345/209 |
| 2020/0403045 | A1* | 12/2020 | Yeon | G09G 3/22 |

FOREIGN PATENT DOCUMENTS

| | | | |
|---|---|---|---|
| KR | 10-1376933 | B1 | 3/2014 |
| KR | 10-1467827 | B1 | 12/2014 |
| KR | 10-1506098 | B1 | 3/2015 |
| KR | 10-1563052 | B1 | 10/2015 |
| KR | 10-1635252 | B1 | 7/2016 |
| KR | 10-1846161 | B1 | 4/2018 |

* cited by examiner

DISPLAY DEVICE

CROSS-REFERENCE TO RELATED APPLICATIONS

This U.S. non-provisional patent application claims priority under 35 U.S.C. § 119 of Korean Patent Application No. 10-2023-0048014 filed on Apr. 12, 2023, the entire contents of which are hereby incorporated by reference.

BACKGROUND

The present disclosure herein relates to a display device with improved reliability.

A display device may include pixels disposed in a display area and a driving circuit configured to drive the pixels. The pixels each may include a pixel circuit and a light emitting element. The driving circuit may be provided through a manufacturing process of the pixel circuit. The pixel circuit and driving circuit each may include transistors. When the display device is used for a long time, a threshold voltage of a transistor is changed causing a malfunction of the transistor.

SUMMARY

The present disclosure may provide a display device including a transistor in which a change amount of the threshold voltage is reduced.

An embodiment of a display device includes: a pixel circuit including a plurality of pixel transistors; a light emitting element electrically connected to the pixel circuit; and a driving circuit configured to provide a prescribed signal to the pixel circuit, and including a plurality of driving transistors, wherein a gate signal is applied to a gate of at least one transistor among the plurality of pixel transistors and the plurality of driving transistors, the gate signal includes a first interval in which a DC signal is applied and a second interval in which an AC signal is applied, the second interval includes a first sub-interval in which a first voltage is applied and a second sub-interval in which a second voltage different from the first voltage is applied, and the first voltage is a negative voltage and the second voltage is a positive voltage or about 0 V.

In an embodiment, the driving circuit may include a plurality of driving stages, the plurality of driving stages each including a clock terminal configured to receive a clock signal and an output terminal configured to output a signal to the pixel circuit, and the at least one transistor may be electrically connected to the clock terminal to receive the clock signal, and the clock signal is the gate signal.

In an embodiment, a voltage of the DC signal may be a positive voltage having a same magnitude as the first voltage, and the second voltage may be about 0 V.

In an embodiment, the pixel circuit may be electrically connected to an initialization scan line, a compensation scan line, a write scan line, and emission signal line, and the driving circuit may provide an initialization scan signal to the initialization scan line, a compensation scan signal to the compensation scan line, a write scan signal to the write scan line, and an emission control signal to the emission signal line.

In an embodiment, the gate signal may be one of the initialization scan signal, the compensation scan signal, the write scan signal, and the emission control signal.

In an embodiment, a voltage of the DC signal may be a positive voltage having a same magnitude as the first voltage.

In an embodiment, a duty ratio of the second interval may be about 90% or greater.

In an embodiment, the at least one transistor may be an oxide thin-film transistor.

In an embodiment, the at least one transistor may be an amorphous indium-gallium-zinc oxide thin-film transistor.

In an embodiment, the at least one transistor may be an N-type thin-film transistor.

In an embodiment, when the second voltage may be about 0 V, a duty ratio of the second sub-interval may be about 0.01% to about 75%.

In an embodiment, when the first voltage is about −20 V to about −10 V and the second voltage is a positive voltage having a same magnitude as the first voltage, a duty ratio of the second sub-interval may be about 0.01% to about 50%.

In an embodiment, when the first voltage is about −30V or higher and smaller than about −20V and the second voltage is a positive voltage having a same magnitude as the first voltage, a duty ratio of the second sub-interval may be about 0.01% to about 30%.

An embodiment of a display device includes: a pixel circuit including a plurality of pixel transistors; a light emitting element electrically connected to the pixel circuit; scan lines including an initialization scan line, a compensation scan line, and a write scan line that are electrically connected to the pixel circuit; and a driving circuit configured to provide a prescribed signal to the pixel circuit, and including a plurality of driving transistors, wherein a gate signal is applied to a gate of an oxide thin-film transistor among the plurality of pixel transistors and the plurality of driving transistors, the gate signal includes a first interval in which a DC signal is applied and a second interval in which an AC signal is applied, the second interval includes a first sub-interval in which a first voltage is applied and a second sub-interval in which a second voltage different from the first voltage is applied, and a duty ratio of the second sub-interval is about 0.01% to about 75%.

In an embodiment, the driving circuit may include a plurality of driving stages, the plurality of driving stages each including a clock terminal configured to receive a clock signal and an output terminal configured to output a signal to the pixel circuit, and the oxide thin-film transistor may be electrically connected to the clock terminal to receive the clock signal, and the clock signal is the gate signal.

In an embodiment, the display device may further include an emission signal line that is electrically connected to the pixel circuit, the driving circuit may provide an initialization scan signal to the initialization scan line, a compensation scan signal to the compensation scan line, a write scan signal to the write scan line, and an emission control signal to the emission signal line, and the gate signal may be one of the initialization scan signal, the compensation scan signal, the write scan signal, and the emission control signal.

In an embodiment, when the first voltage is about −30 V to about −10 V and the second voltage is about 0 V, a duty ratio of the second sub-interval may be about 0.01% to about 75%.

In an embodiment, when the first voltage is about −20 V to about −10 V and the second voltage is a positive voltage having a same magnitude as the first voltage, a duty ratio of the second sub-interval may be about 0.01% to about 50%.

In an embodiment, when the first voltage is about −30V or higher and smaller than about −20V and the second voltage is a positive voltage having a same magnitude as the first voltage, a duty ratio of the second sub-interval may be about 0.01% to about 30%.

In an embodiment, the oxide thin-film transistor may be an N-type thin-film transistor.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Figure 1:
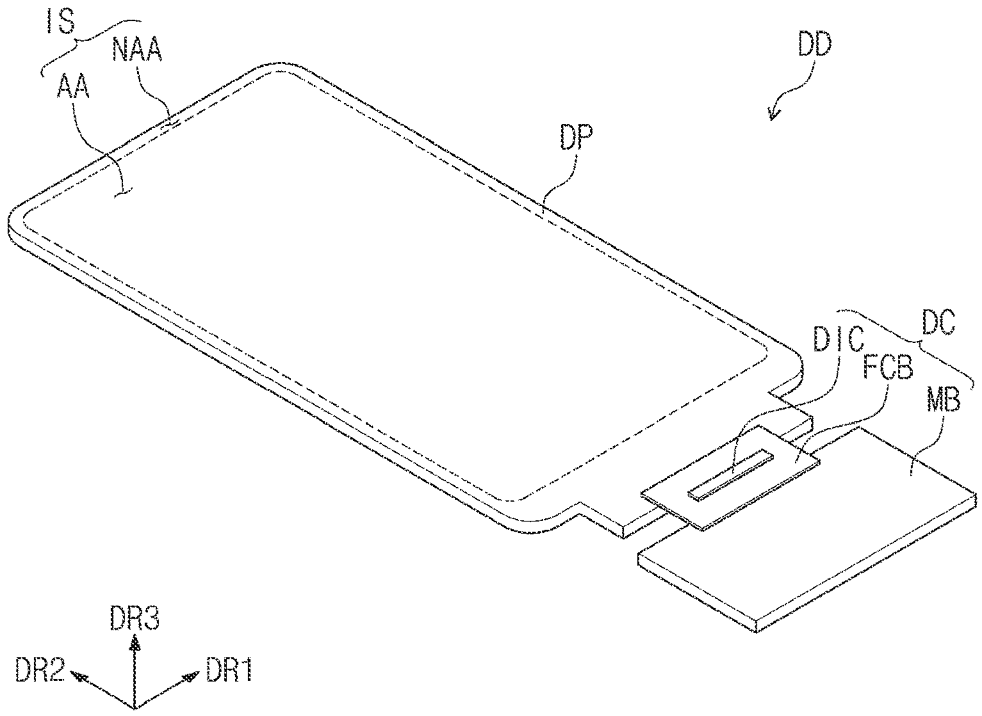
FIG. 1 is a perspective view of a display device according to an embodiment of the inventive concept.

It will be understood that when an element or layer is referred to as being "on", "connected to" or "coupled to" another element or layer, it can be directly on, connected or coupled to the other element or intervening third elements may be present.

Like reference numerals in the drawings refer to like elements. In addition, in the drawings, the thickness and the ratio and the dimension of the element are exaggerated for effective description of the technical contents.

Terms such as first, second, and the like may be used to describe various components, but these components should not be limited by the terms. These terms are only used to distinguish one element from another. For instance, a first component may be referred to as a second component, or similarly, a second component may be referred to as a first component, without departing from the scope of the present disclosure. The singular expressions include plural expressions unless the context clearly dictates otherwise.

In addition, the terms such as "under", "lower", "on", and "upper" are used for explaining associations of items illustrated in the drawings. The terms are used as a relative concept and are described with reference to the direction indicated in the drawings.

It should be understood that the terms "comprise," "include," and "have" (as well as their variations such as "comprising") are intended to specify the presence of stated features, integers, steps, operations, elements, components, or combinations thereof in the disclosure, but do not preclude the presence or addition of one or more other features, integers, steps, operations, elements, components, or combinations thereof.

Unless otherwise defined, all terms (including technical and scientific terms) used herein have the same meaning as commonly understood by one of ordinary skill in the art to which example embodiments belong. In addition, it will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, embodiments of the inventive concept will be described with reference to the accompanying drawings.

Figure 2:
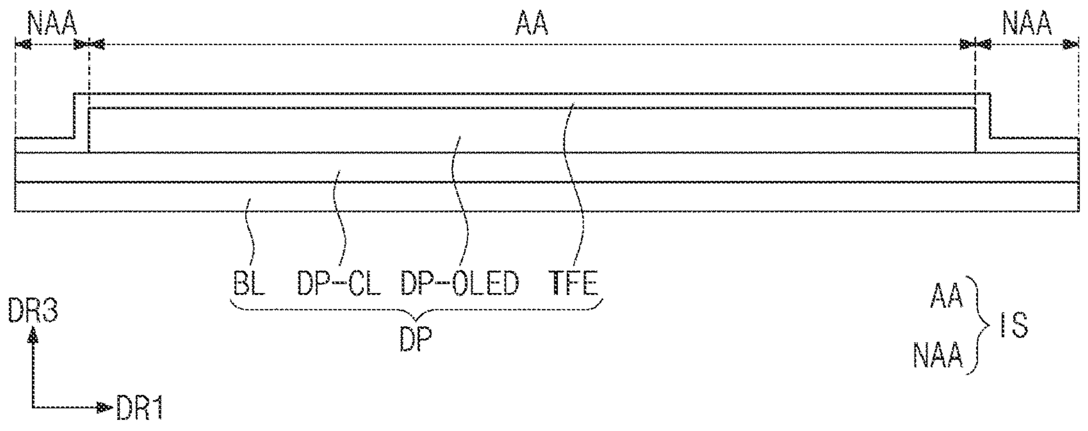
FIG. 2 is a cross-sectional view of a display panel according to an embodiment of the inventive concept.

FIG. 1 is a perspective view of a display device DD according to an embodiment of the inventive concept. FIG. 2 is a cross-sectional view of a display panel DP according to an embodiment of the inventive concept.

Referring to FIG. 1, the display device DD may be activated in response to an electrical signal. The display device DD may be used in a small or medium electronic device such as a monitor, a notebook computer, or a mobile phone as well as a large electronic device such as a television. In the embodiment, the display device DD is illustrated as being used in a smartphone, for example.

The display device DD may display an image through a display surface IS that is parallel to a plane defined by a first direction DR1 and a second direction DR2 that are orthogonal to each other. In the embodiment, on the basis of a third direction DR3 that is a normal to the display surface IS, a front surface (or a top surface) and a rear surface (or a bottom surface) of each member are defined. The front surface and the rear surface may face each other in the third direction DR3.

The display device DD may include a display panel DP and a driving circuit unit DC. Although not shown in the figure, the display device DD may further include an input sensor disposed on the display panel DP.

Referring to FIG. 2, the display panel DP may include a base layer BL, a circuit layer DP-CL, a light emitting element layer DP-OLED, and an encapsulation layer TFE.

The base layer BL may include a synthetic resin layer. The synthetic resin layer may be a polyimide-based resin layer, but the material is not particularly limited. The base layer BL may include a first synthetic resin layer, an inorganic layer, and a second synthetic resin layer that are sequentially laminated.

The circuit layer DL-CL is disposed on the base layer BL. The circuit layer DP-CL includes at least one insulation layer and circuit elements. The circuit elements include a signal line, a pixel driving circuit (hereinafter, a pixel circuit) or the like. The circuit layer DP-CL may be provided through processes of providing an insulation layer, a semiconductor layer, and a conductive layer through coating, deposition or the like, and photolithography processes of patterning the insulation layer, the semiconductor layer and the conductive layer.

The display element layer DP-OLED may include a light emitting element and a pixel definition layer. The encapsulation layer TFE encapsulates the display element layer DP-OLED. The encapsulation layer TFE may include at least one organic layer and at least one inorganic layer. The inorganic layer may protect the display element layer DP-OLED from moisture/oxygen. The inorganic film may include a silicon nitride layer, a silicon oxy-nitride layer, a silicon oxide layer, a titanium oxide layer, an aluminum oxide layer, or the like, and is not particularly limited thereto.

Referring to FIGS. 1 and 2, the display surface IS may include a display area AA in which the image is displayed and a non-display area NAA in which the image is not displayed. Pixels are disposed in the display area AA and a driving circuit may be disposed in the non-display area NAA. However, the embodiment is not limited thereto. For example, at least a portion of the driving circuit may overlap the display area AA.

Referring to FIG. 1, a driving circuit unit DC may be electrically connected to the display panel DP. The driving circuit unit DC may include a main circuit board MB, a flexible circuit board FCB, and a driving chip DIC.

The main circuit board MB may include various types of driving circuits for driving the display panel DP, a connector for supplying power, or the like. The flexible circuit board FCB may electrically connect the main circuit board MB and the display panel DP. The driving chip DIC may include a data driving circuit. In the embodiment, the driving chip DIC may be mounted on the flexible circuit board FCB, but is not limited thereto. The driving chip DIC may also be mounted on the display panel DP. In this case, the flexible circuit board FCB may be omitted.

Figure 3A:
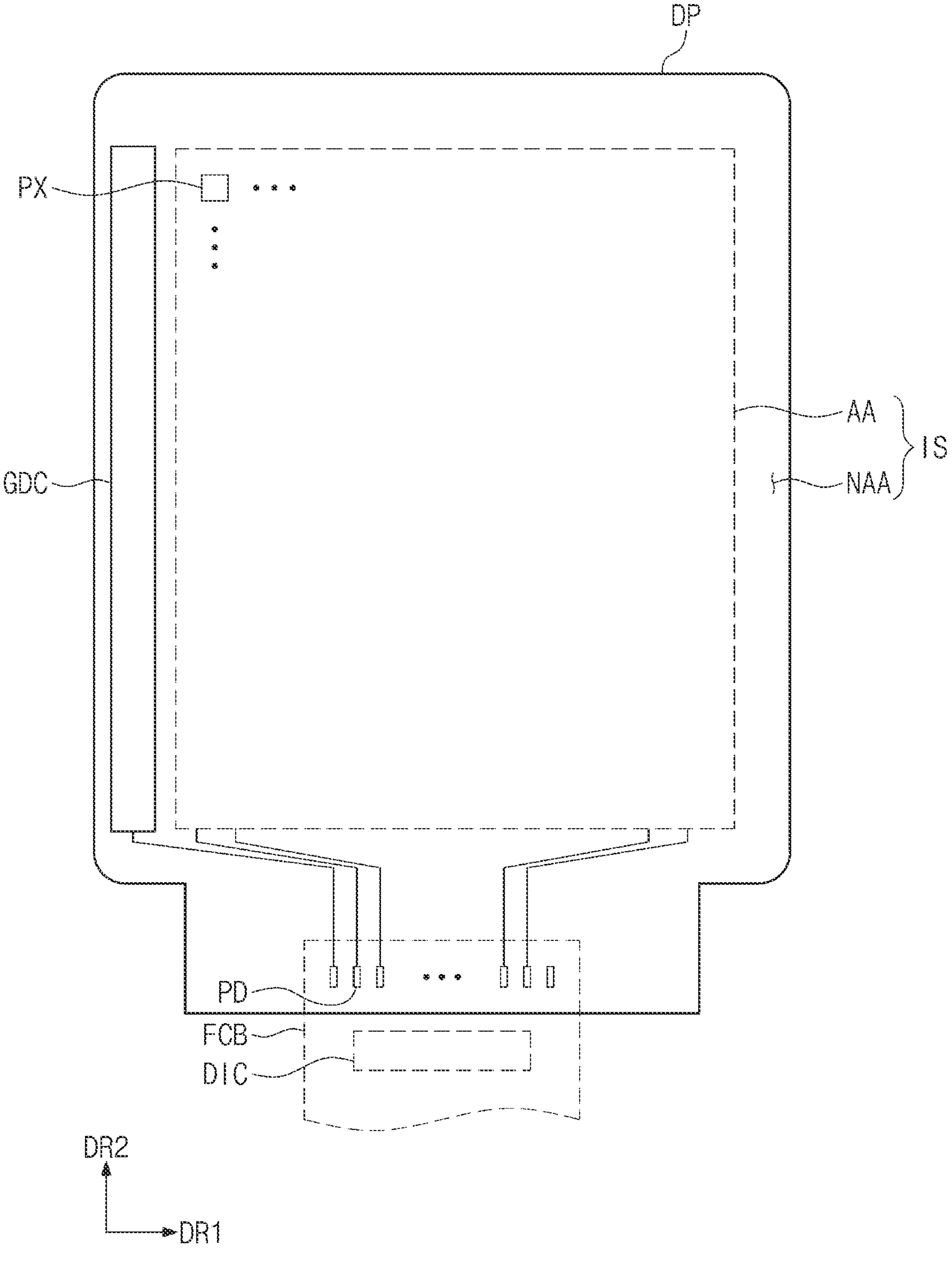
FIG. 3A is a plan view of a display panel according to an embodiment of the inventive concept.
Figure 3B:
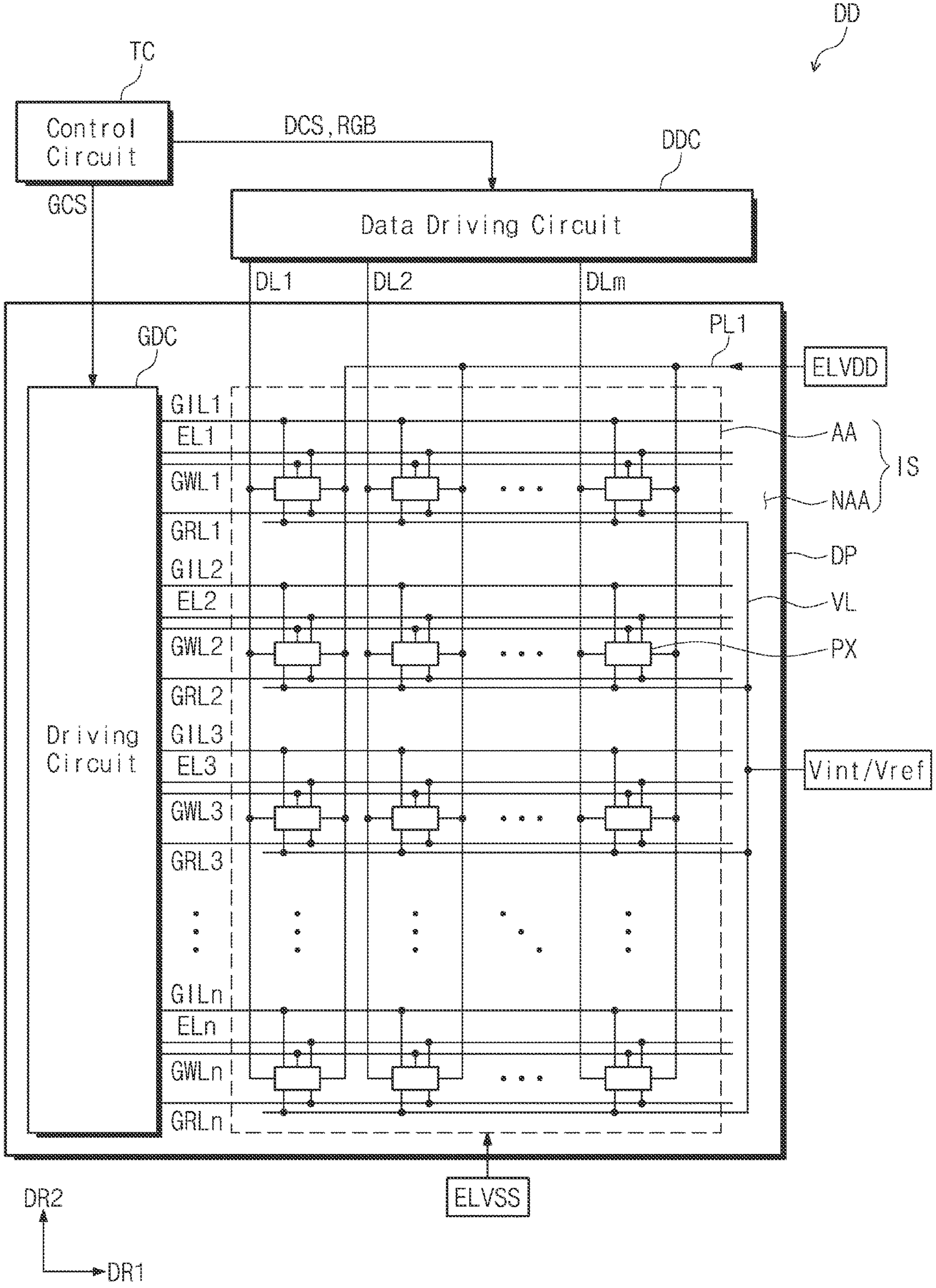
FIG. 3B is a block diagram of a display device according to an embodiment of the inventive concept.

FIG. 3A is a plan view of the display panel DP according to an embodiment of the inventive concept. FIG. 3B is a block diagram of the display device DD according to an embodiment of the inventive concept.

Referring to FIGS. 3A and 3B, the display panel DP includes a display area AA in which an image is displayed and a non-display area NAA disposed outside the display area AA. The plurality of pixels PX may be disposed in the display area AA. The driving circuit GDC for driving the plurality of pixels PX may be provided in the non-display area NAA. At least a portion of the driving circuit GDC may also be disposed in the display area AA.

The driving circuit GDC may be directly provided on the base layer BL (see FIG. 2) through the photolithography processes. The driving circuit GDC may be provided through a process of providing pixel circuits of the plurality of pixels PX. A plurality of pads PD disposed in the non-display area NAA of the display panel DP may be connected with the flexible circuit board FCB.

Referring to FIG. 3B, the display device DD may include a display panel DP, a driving circuit GDC, a data driving circuit DDC, and a control circuit TC. The driving circuit GDC may be embedded in the display panel DP, and each of the data driving circuit DDC and the control circuit TC may be provided in a driving chip.

The control circuit TC controls driving of the driving circuit GDC and the data driving circuit DDC. The control circuit TC may convert the data format of input image signals so as to meet the interface specification to the data driving circuit DDC to generate image data RGB. The control unit TC outputs the image data RGB and various types of control signals DCS, GCS.

The driving circuit GDC receives the first control signal GCS from the control circuit TC. The first control signal GCS may include a vertical start signal for starting the operation of the driving unit GDC, a clock signal for determining signal output times, or the like. The driving circuit GDC outputs a plurality of scan signals to the plurality of scan lines GWL1 to GWLn, GRL1 to GRLn, GIL1 to GILn to be described below. In addition, the driving circuit GDC generates a plurality of emission control signals, and outputs the emission control signals to the plurality of emission signal lines EL1 to ELn.

The data driving circuit DDC receives the second control signal DCS and the image data RGB from the control circuit TC. The data driving circuit DDC converts the image data RGB into data signals, and outputs the data signals to a plurality of data lines DL1 to DLm to be described below. The data signals have analog voltages corresponding to grayscale values of the image data RGB. The data driver DDC may configure the driving chip DIC shown in FIG. 1.

The display panel DP includes the plurality of scan lines GWL1 to GWLn, GRL1 to GRLn, GIL1 to GILn, the plurality of emission control lines EL1 to ELn, the plurality of data lines DL1 to DLm, and the plurality of pixels PX.

The plurality of scan lines GWL1 to GWLn, GRL1 to GRLn, GIL1 to GILn extend in the first direction DR1 and are arrayed in the second direction DR2 orthogonal to the first direction DR1. The plurality of emission signal lines EL1 to ELn may be respectively arrayed in parallel to corresponding scan lines among the plurality of scan lines GWL1 to GWLn, GRL1 to GRLn, GIL1 to GILn. The plurality of data lines DL1 to DLm may be insulated from and cross the plurality of scan lines GWL1 to GWLn, GRL1 to GRLn, GIL1 to GILn.

The plurality of scan lines GWL1 to GWLn, GRL1 to GRLn, GIL1 to GILn may include a plurality of write scan lines GWL1 to GWLn, a plurality of compensation scan lines GRL1 to GRLn, and a plurality of initialization scan lines GIL1 to GILn. Each of the plurality of pixels PX is connected to a corresponding write scan line among the plurality of write scan lines GWL1 to GWLn, a corresponding compensation scan line among the plurality of compensation scan lines GRL1 to GRLn, a corresponding initialization signal line among the plurality of initialization scan lines GIL1 to GILn, and a corresponding data line among the plurality of data lines DL1 to DLm. The display panel DP receives a first power supply voltage ELVDD and a second power supply voltage ELVSS. The first power supply voltage ELVDD may be provided to the plurality of pixels PX through a first power line PL1. The second power supply voltage ELVSS may be provided to the plurality of pixels PX through a second power line (not shown).

The display panel DP receives an initialization voltage Vint and a reference voltage Vref. The initialization voltage Vint and the reference voltage Vref may be provided to the plurality of pixels PX through the voltage line VL.

Figure 4A:
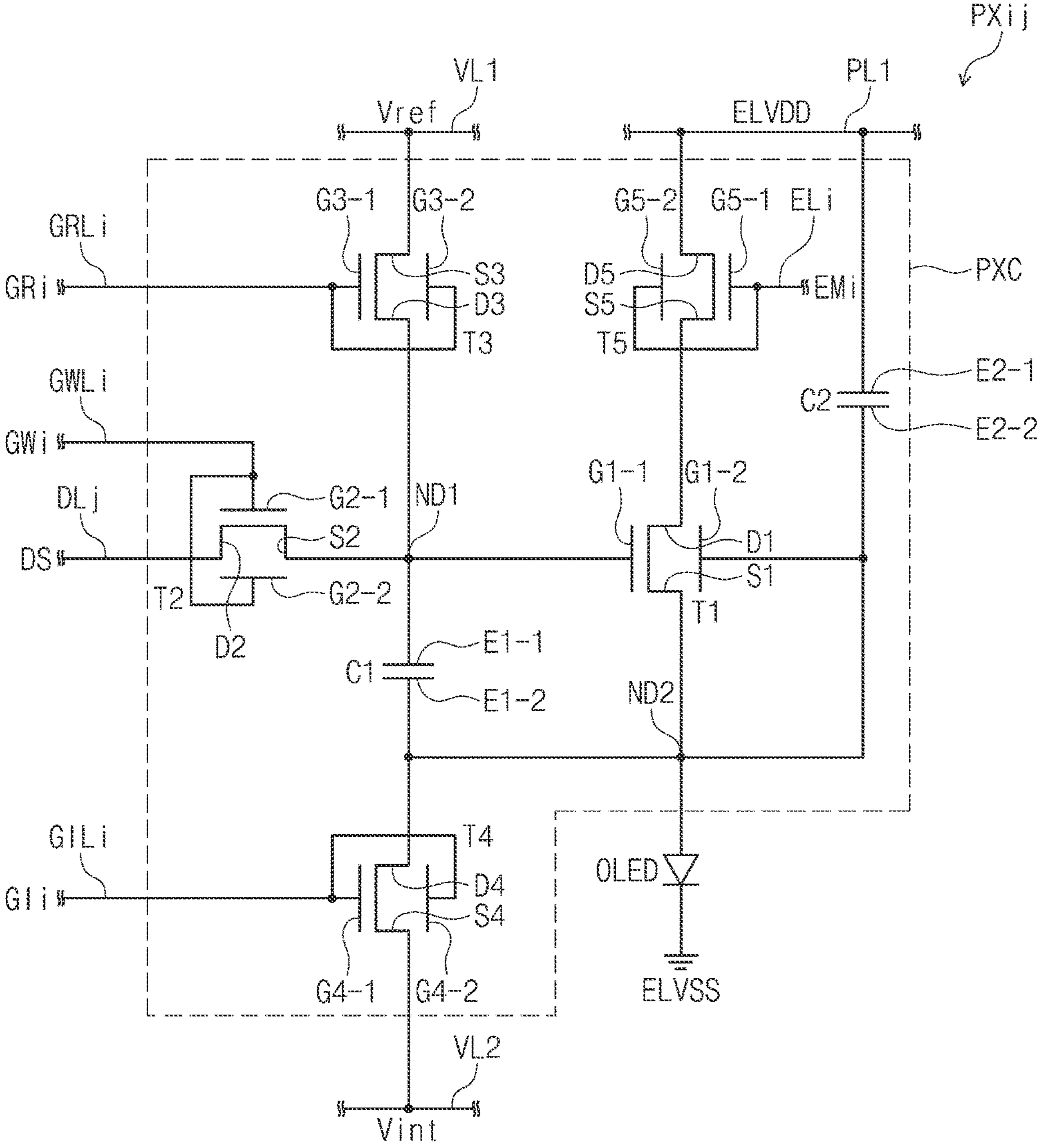
FIG. 4A is an equivalent circuit diagram of a pixel according to an embodiment of the inventive concept.
Figure 4B:
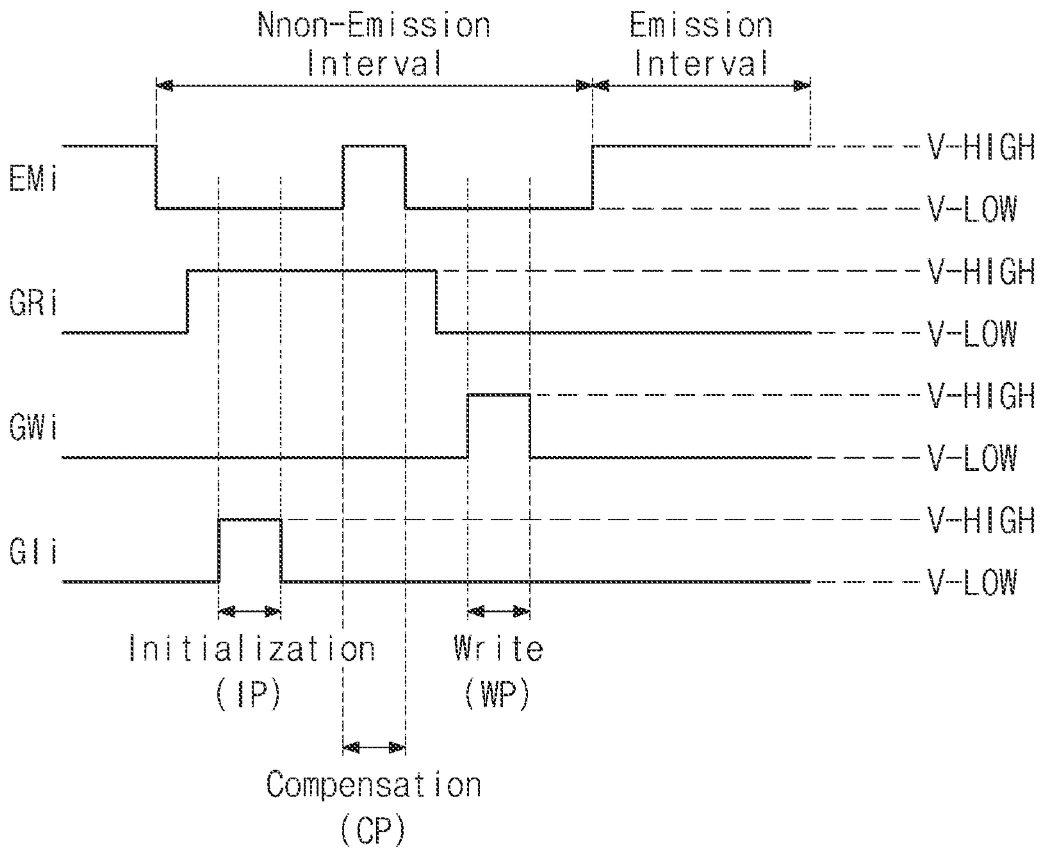
FIG. 4B is a waveform diagram of driving signals for driving the pixel shown in FIG. 4A.

FIG. 4A is an equivalent circuit diagram of a pixel PXij according to an embodiment of the inventive concept. FIG. 4B is a waveform diagram of the driving signals for driving the pixel PXij shown in FIG. 4A.

Referring FIG. 4A, the pixel PXij may include a pixel circuit PXC and a light emitting element OLED electrically connected to the pixel circuit PXC.

The pixel PXij may be electrically connected to a j-th data line DLj among the data lines DL1 to DLm, an i-th scan lines GILi, GRLi, GWLi among the scan lines GIL1 to GILn, GRL1 to GRLn, GWL1 to GWLn, and an i-th emission signal line ELj among the emission signal lines EL1 to ELn. The i-th scan lines GILi, GRLi, GWLi may be referred to below as an initialization scan line GILi, a compensation scan line GRLi, and a write scan line GWLi.

In an embodiment of the inventive concept, the pixel circuit PXC may include first to fifth transistors T1 to T5, a first capacitor C1, and a second capacitor C2. The first to fifth transistors T1 to T5 may be referred to as pixel transistors. The pixel PXij shown in FIG. 4A is merely an example, and the circuit configuration of the pixel PXij may be modified in various ways. For example, in an embodiment of the inventive concept, at least one of the first to fifth transistors T1 to T5 may be omitted, or an additional transistor may be further included in the pixel PXij.

In an embodiment of the inventive concept, each of the first to fifth transistors T1 to T5 may be an N-type thin-film transistor with an oxide semiconductor layer. The first transistor T1 may be referred to as a driving thin-film transistor, the second transistor T2 as a switching thin-film transistor, the third transistor T3 as a compensation thin-film transistor, the fourth transistor T4 as an initialization thin-film transistor, and the fifth transistor T5 as an emission control thin-film transistor.

Each of the first to fifth transistors T1 to T5 are shown as having two gates, but at least any one transistor may include only one gate. Upper gates G2-1, G3-1, G4-1, G5-1 and lower gates G2-2, G3-2, G4-2, G5-2 of the second to fifth transistors T2 to T5 are respectively shown as being electrically connected to each other, but the embodiment is not limited thereto. Each of the lower gates G2-2, G3-2, G4-2, G5-2 of the second to fifth transistors T2 to T5 may be a floating electrode.

In the embodiment, a node to which a first upper gate G1-1 of the first transistor T1 is connected is defined as a first node ND1, and a node to which a source S1 of the first transistor T1 is connected may be defined as a second node ND2.

The light emitting element OLED includes a first electrode electrically connected to the second node ND2, a second electrode configured to receive the second power supply voltage ELVSS, and a light emitting layer disposed between the first electrode and the second electrode. The first transistor T1 is electrically connected between the second node ND2 and the first power line PL1 configured to receive the first power supply voltage ELVDD. The first transistor T1 may include a source S1 (hereinafter, a first source) connected to the second node ND2, a drain D1 (hereinafter, a first drain), a semiconductor area, and the first upper gate G1-1 electrically connected to the first node ND1. The first transistor T1 may further include a first lower gate G1-2 connected to the second node ND2.

The second transistor T2 is electrically connected between the j-th data line DLj and the first node ND1. The second transistor T2 may include a source S2 (hereinafter, a second source) connected to the first node ND1, a drain D2 (hereinafter, a second drain) connected to the j-th data line DLj, a semiconductor area, and a gate G2-1 (hereinafter, a second upper gate) connected to the write scan line GWLi. The second transistor T2 may further include a gate G2-2 (referred to as a second lower gate) electrically connected to the second upper gate G2-1.

The third transistor T3 is electrically connected between the first node ND1 and a first voltage line VL1 configured to receive the reference voltage Vref. The third transistor T3 may include a drain D3 (hereinafter, a third drain) connected to the first node ND1, a source S3 (hereinafter, a third source) connected to the first voltage line VL1, and a third upper gate G3-1 connected to the compensation scan line GRLi. The third transistor T3 may further include a third lower gate G3-2 electrically connected to the third upper gate G3-1.

The fourth transistor T4 is electrically connected between the second node ND2 and a second voltage line VL2 configured to receive the initialization voltage Vint. The fourth transistor T4 may further include a drain D4 (hereinafter, a fourth drain) connected to the second node ND2, a source S4 (hereinafter, a fourth source) connected to the second voltage line VL2, a semiconductor area, and a fourth upper gate G4-1 connected to the initialization scan line GRLi. The fourth transistor T4 may further include a fourth lower gate G4-2 electrically connected to the fourth upper gate G4-1.

The fifth transistor T5 may be connected between the first power line PL1 and the first drain D1. In the embodiment, the fifth transistor T5 may include a source S5 (hereinafter a fifth source) connected to the first power line PL1, a drain D5 (hereinafter a fifth drain) connected to the first drain D1, a semiconductor area, and a fifth upper gate G5-1 connected to the i-th emission signal line ELi. The fifth transistor T5 may further include a fifth lower gate G5-2 electrically connected to the fifth upper gate G5-1.

The first capacitor C1 may be electrically connected between the first node ND1 and the second node ND2. The first capacitor C1 includes a first electrode E1-1 connected to the first node ND1, and a second electrode E1-2 connected to the second node ND2.

The second capacitor C2 is electrically connected between the first power line PL1 and the second node ND2. The second capacitor C2 includes a first electrode E2-1 connected to the first power line PL1, and a second electrode E2-2 connected to the second node ND2.

The operation of the pixel PXij will be described more specifically with reference to FIGS. 3B, 4A, and 4B. The display device DD displays an image for each frame interval. The plurality of write scan lines GWL1 to GWLn, the plurality of compensation scan lines GRL1 to GRLn, the plurality of initialization scan lines GIL1 to GILn, and the plurality of emission signal lines EL1 to ELn may be sequentially scanned during the frame interval. FIG. 4B shows a portion of the frame interval.

Referring to FIGS. 4A and 4B, each of the scan signals GRi, GWi, GIi and the emission control signal EMi may have a high voltage V-HIGH (or a high level) during a partial interval, and have a low voltage V-LOW (or a low level) during a partial interval. The aforementioned first to fifth N-type transistors T1 to T5 are turned on, when the corresponding scan signal has the high voltage V-HIGH.

During an initialization interval IP, the third transistor T3 and the fourth transistor T4 are turned on by a compensation scan signal GRi and an initialization scan signal GIi, respectively. The first node ND1 is initialized with the reference voltage Vref. The second node ND2 is initialized with the initialization voltage Vint. The first capacitor C1 is initialized with a difference value between the reference voltage ref and the initialization voltage Vint. The second capacitor C2 is initialized with a difference value between the first power supply voltage ELVDD and the initialization voltage Vint.

During a compensation interval CP, the third transistor T3 and the fifth transistor T5 are turned on by the compensation scan signal GRi and the emission control signal EMi. The voltage of the first capacitor C1 is compensated by a voltage corresponding to the threshold voltage of the first transistor T1.

During a write interval WP, the second transistor T2 is turned on by a write scan signal GWi. The second transistor T2 outputs a voltage corresponding to a data signal DS. Consequently, the first capacitor C1 is charged with a voltage corresponding to the data signal DS. The first capacitor C1 is charged by the data signal DS for which the threshold voltage of the first transistor T1 is compensated. For each of the pixels PX (see FIG. 3B), the first transistors T1 may have a different threshold voltage, but the pixel PXij shown in FIGS. 4A and 4B may provide, to the light emitting elements OLED, a current with the magnitude proportional to the data signal DS regardless of deviations of the threshold voltages of the first transistors T1.

Thereafter, during an emission interval, the fifth transistor T5 is turned on by the emission control signal EMi. The first transistor T1 provides a current corresponding to the voltage stored in the first capacitor C1 to the light emitting element OLED. The light emitting element OLED may emit light at a luminance corresponding to the data signal DS.

Figure 5:
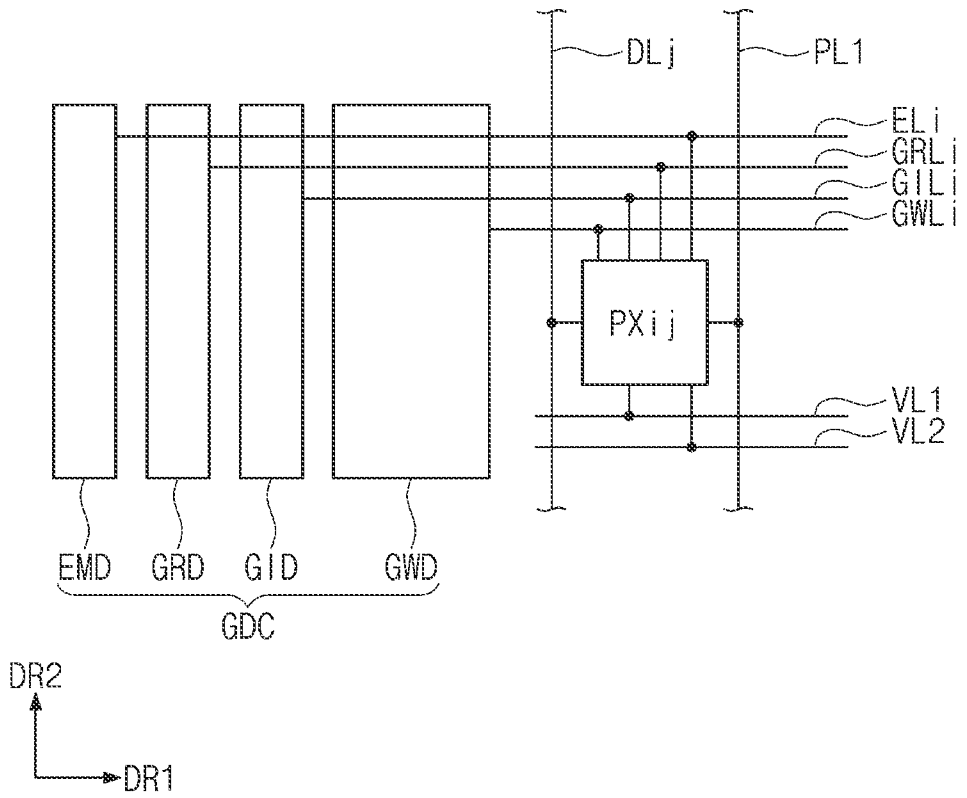
FIG. 5 is a block diagram of a driving circuit connected to a pixel according to an embodiment of the inventive concept.
Figure 6:
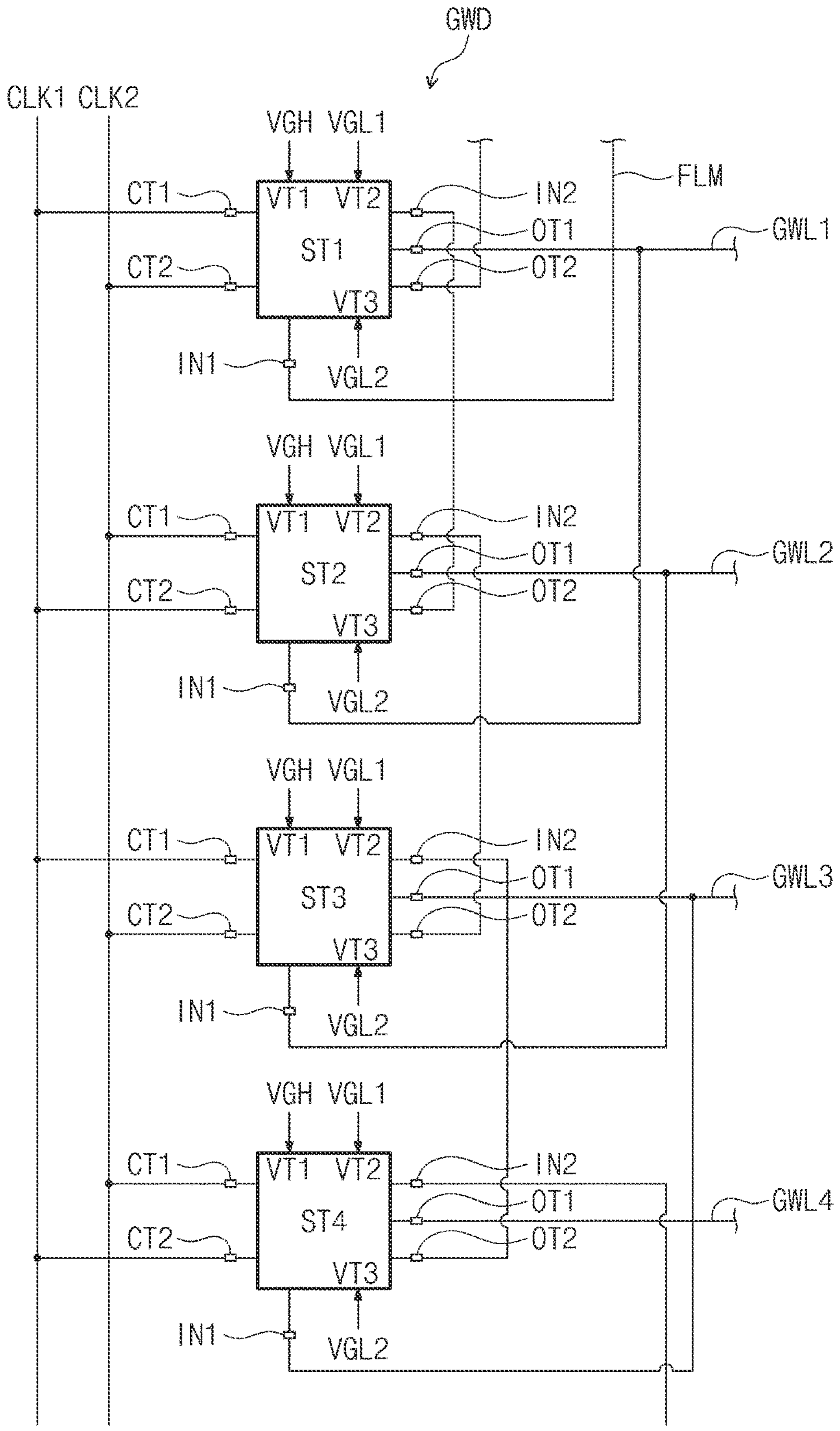
FIG. 6 is a block diagram of a scan driving circuit according to an embodiment of the inventive concept.
Figure 7:
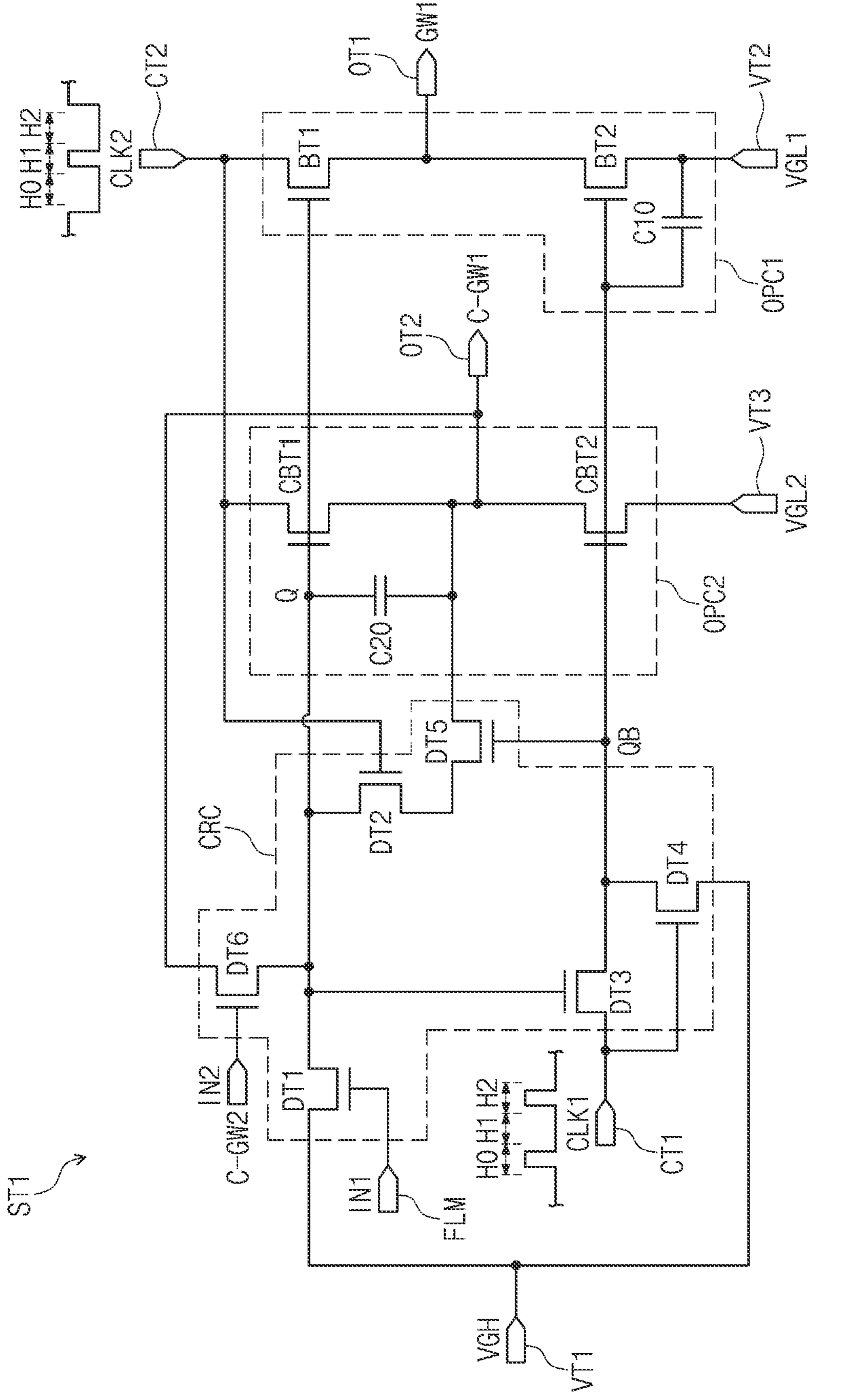
FIG. 7 is a circuit diagram of a first stage shown in FIG. 6.

FIG. 5 is a block diagram of the driving circuit GDC and the pixel PXij according to an embodiment of the inventive concept. FIG. 6 is a block diagram of a first scan driving circuit GWD according to an embodiment of the inventive concept. FIG. 7 is a circuit diagram of a first stage ST1 illustrated in FIG. 6.

Referring to FIGS. 3B and 5, the driving circuit GDC may include an emission control circuit EMD, the first scan driving circuit GWD, a second scan driving circuit GRD, and a third scan driving circuit GID. A disposition sequence in the first direction DR1 of the emission control circuit EMD, the first scan driving circuit GWD, the second scan driving circuit GRD, and the third scan driving circuit GID shown in FIG. 5 is merely an example and is not particularly limited. The emission control circuit EMD, the first scan driving circuit GWD, the second scan driving circuit GRD, and the third scan driving circuit GID each may include a plurality of driving transistors.

The emission control circuit EMD is connected to the emission signal lines EL1 to ELn (see FIG. 3B), and the i-th example emission signal line ELi is shown in FIG. 5. FIG. 5 illustrates the example write scan line GWLi connected to the first scan driving circuit GWD, the example compensation scan line GRLi connected to the second scan driving circuit GRD, and the example initialization scan line GILi connected to the third scan driving circuit GID. In addition, the example pixel PXij connected to the write scan line GWLi and a j-th data line DLj is shown.

Referring to FIG. 6, the first example scan driving circuit GWD is shown. The first scan driving circuit GWD may include a plurality of stages ST1 to ST4 connected to each other. The stages ST1 to ST4 may have the substantially same circuit configuration. FIG. 6 shows example four stages ST1 to ST4, but the first scan driving circuit GWD may include stages respectively corresponding to the write scan lines GWL1 to GWLn shown in FIG. 3B.

The stages ST1 to ST4 each may include a first input terminal IN1, a second input terminal IN2, a first clock terminal CT1, a second clock terminal CT2, a first output terminal OT1, and a second output terminal OT2. In addition, the stages ST1 to ST4 each may include first to third voltage terminals VT1 to VT3.

The first input terminal IN1 may receive a scan signal output from a first output terminal OT1 of a previous stage or an initiation signal FLM. The initiation signal FLM may be output from a dummy stage previous to the first stage ST1. The second input terminal IN2 may receive a carry signal output from a second output terminal OT2 of the next stage.

Each of the stages ST1 to ST4 may receive first and second clock signals CLK1 and CLK2 through the first and second clock terminals CT1, CT2. The first clock terminal CT1 of each of the odd-numbered stages ST1, ST3 among the stages ST1 to ST4 may receive the first clock signal CLK1, and the second clock terminal CT2 may receive the second clock signal CLK2. In contrast, the first clock terminals CT1 of each of the even-numbered stages ST2, ST4 may receive the second clock signal CLK2, and the second clock terminal CT2 may receive the first clock signal CLK1. The first clock signal CLK1 and the second clock signal CLK2 may have the same period and different phases. For example, the second clock signal CLK2 may have an inverse phase to the first clock signal CLK1.

The first voltage terminal VT1, the second voltage terminal VT2, and the third voltage terminal VT3 may be respectively provided with a high voltage VGH, a first low voltage VGL1, and a second low voltage VGL2. The high voltage VGH, the first low voltage VGL1 and the second low voltage VGL2 each may have a DC voltage level.

The high voltage VGH may be set to a high level of a scan signal, namely, to a gate-on voltage, and the first low voltage VGL1 may be set to a low level of the scan signal, namely, to a gate-off voltage. The second low voltage VGL2 may be a bias voltage having a different level from the first low voltage VGL1. The stages ST1 to ST4 may sequentially output scan signals to the write scan lines GWL1 to GWL4.

Hereinafter, referring to FIG. 7, the circuit configuration of the first stage ST1 among the stages ST1 to ST4 will be described. Since the stages ST1 to ST4 each have the same circuit configuration, the description of the circuit configuration of the other stages ST2 to ST4 will be omitted.

Referring to FIG. 7, the first stage ST1 includes a first output unit OPC1, a second output unit OPC2, and a control unit CRC.

The first output unit OPC1 includes a first buffer transistor BT1, a second buffer transistor BT2, and a first capacitor C10. The second output unit OPC2 includes a first carry transistor CBT1, a second carry transistor CBT2, and a second capacitor C20. The control unit CRC includes first to sixth transistors DT1 to DT6. The first buffer transistor BT1, the second buffer transistor BT2, the first carry transistor CBT1, the second carry transistor CBT2, and first to sixth control transistors DT1 to DT6 may be referred to as driving transistors or driving circuit transistors.

The operation of the first stage ST1 will be described on the basis of three horizontal intervals H0, H1, H2. During the corresponding horizontal interval H1, the first stage ST1 outputs the corresponding scan signal GW1 and the corresponding carry signal C-GW1.

During the previous horizontal interval H0, the initiation signal FLM is applied to the first input terminal IN1 to turn on the first control transistor DT1. A high voltage VGH applied to the first voltage terminal VT1 is provided to a first node Q.

During the prior horizontal interval H0, the fourth control transistor DT4 is turned on by the first clock signal CLK1 with a high level. A high voltage VGH applied to the first voltage terminal VT1 is provided to a second node QB. The fourth control transistor DT4 and the second carry transistor CBT2 are turned on. Here, during the previous horizontal interval H0, the second control transistor DT2 is turned off by the second clock signal CLK2 with a low level, and thus the second capacitor C20 is charged to a difference voltage between the high voltage VGH and the second low voltage VGL2.

During the previous horizontal interval H0, the first buffer transistor BT1, the second buffer transistor BT2, the first carry transistor CBT1, and the second carry transistor CBT2 are turned on, and the first low voltage VGL1 and the second low voltage VGL2 are respectively provided to the first output terminal OT1 and the second output terminal OT2. The second capacitor C20 is made to maintain the potential of the first node Q until the corresponding horizontal interval H1. Accordingly, during the corresponding horizontal interval H1, the first buffer transistor BT1 and the first carry transistor CBT1 are turned on.

The corresponding horizontal interval H1 may be a turn-on interval of the first buffer transistor BT1 and the first carry transistor CBT1. A high voltage of the second clock signal CLK2 may be provided to the first output terminal OT1 and the second output terminal OT2. The high voltage of the second clock signal CLK2 may be identical to a high voltage V-HIGH of the write scan signal GWi descried with reference to FIG. 4B, but is not limited thereto.

During the next horizontal interval H2, the initiation signal FLM has a low level, and thus the first control transistor DT1 is turned off. During the next horizontal interval H2, the fourth control transistor DT4 is turned on by the first clock signal CLK1 with a high level. The high voltage VGH applied to the first voltage terminal VT1 is provided to the second node QB. Here, the second buffer transistor BT2 and the second carry transistor CBT2 are turned on. The next horizontal interval H2 may be a turn-on interval of the second buffer transistor BT2 and the second carry transistor CBT2.

The first low voltage VGL1 and the second low voltage VGL2 are respectively provided to the first output terminal OT1 and the second output terminal OT2. The first low voltage provided to the first output terminal OT1 may be identical to the low voltage V-LOW of the write scan signal GWi descried with reference to FIG. 4B, but is not limited thereto.

In addition, the sixth control transistor DT6 configured to receive the carry signal C-GW2 from the second stage ST2 (see FIG. 6) is turned on. The sixth control transistor DT6 provides the second low voltage VGL2 to the first node Q. The first buffer transistor BT1 and the second carry transistor CBT2 are turned on.

Figure 8A:
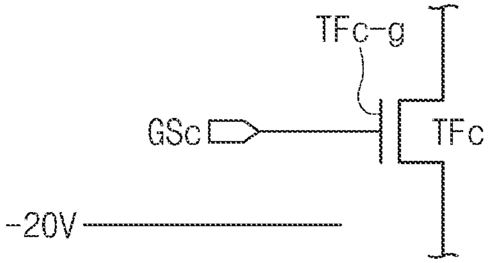
FIG. 8A illustrates a gate signal according to a comparative example of the inventive concept and a transistor to which the gate signal is provided.
Figure 8B:
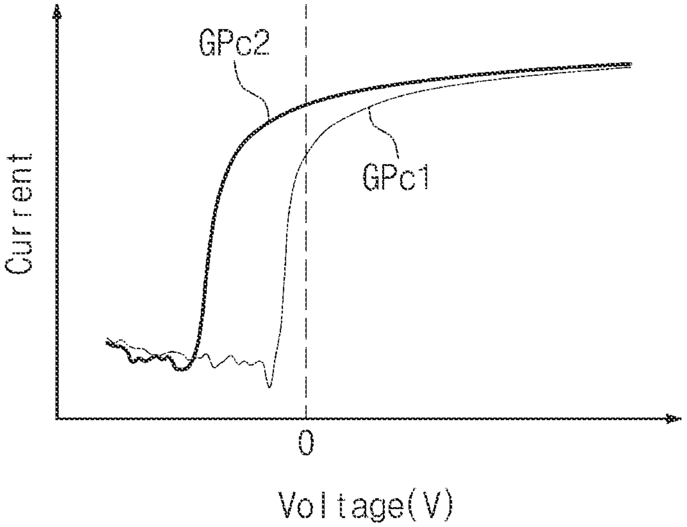
FIG. 8B is a graph showing a characteristic change in the transistor shown in FIG. 8A.

FIG. 8A illustrates a gate signal according to a comparative example of the inventive concept and a transistor to which the gate signal is provided. FIG. 8B is a graph showing a characteristic change in the transistor shown in FIG. 8A.

Referring to FIG. 8A, a transistor TFc may be one of the pixel transistors included in the pixel circuit PXC (see FIG. 4A) and the driving transistors included in the driving circuit GDC (see FIG. 3B). The transistor TFc may include a semiconductor pattern including oxide.

According to a comparative example of the inventive concept, a gate signal GSc may be applied to a gate TFc-g of the transistor TFc. The gate signal GSc may be a DC signal having a negative DC voltage. FIG. 8A shows that the example gate signal GSc with a voltage of −20 V is applied.

Referring to FIG. 8B, a first comparative graph GPc1 is a transfer curve of the transistor TFc in an initial state, and a second comparative graph GPc2 is a transfer curve of the transistor TFc in a negative bias illumination stress (NBIS) environment for a prescribed time, for example, about 4,000 seconds.

Referring to the first comparative graph GPc1 and the second comparative graph GPc2, it may be confirmed that, after an NBIS reliability test (a negative DC voltage and light are applied), the characteristics of the transistor TFc change. When the light is incident to a semiconductor pattern of the transistor TFc, an optical current is generated. The optical current may move the threshold voltage of the transistor TFc to negative voltages. In this case, the transistor TFc may malfunction to cause the reliability to be reduced.

Figure 9A:
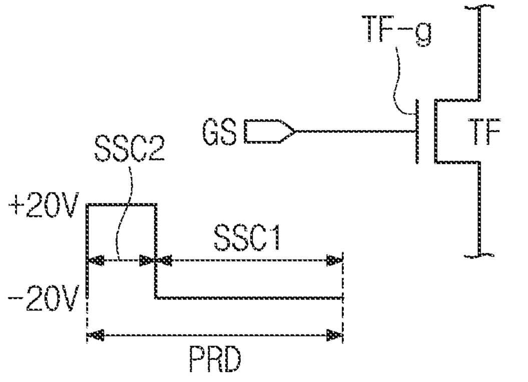
FIG. 9A illustrates a gate signal according to an embodiment of the inventive concept and a transistor to which the gate signal is provided.
Figure 9B:
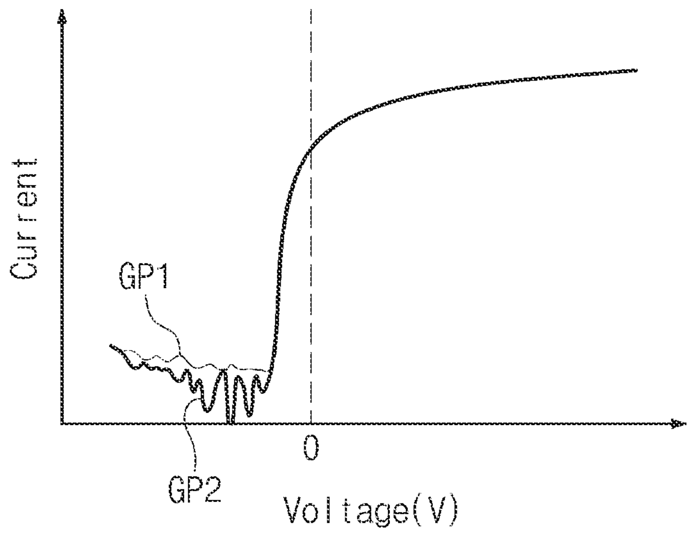
FIG. 9B is a graph showing a characteristic change in the transistor shown in FIG. 9A.

FIG. 9A illustrates a gate signal according to an embodiment of the inventive concept and a transistor to which the gate signal is provided. FIG. 9B is a graph showing a characteristic change in the transistor shown in FIG. 9A.

Referring to FIG. 9A, the transistor TF may be one of the pixel transistors included in the pixel circuit PXC (see FIG. 4A) and the driving transistors included in the driving circuit GDC (see FIG. 3B).

The transistor TF may include a semiconductor pattern including oxide. The semiconductor pattern may include an amorphous silicon semiconductor or a crystalline oxide semiconductor. For example, the oxide semiconductor may include a metal oxide of zinc (Zn), indium (In), gallium (Ga), tin (Sn), titanium (Ti) or the like, or a mixed material of a metal such as zinc (Zn), indium (In), gallium (Ga), tin (Sn), or titanium (Ti), and an oxide thereof. Alternatively, the oxide semiconductor may include indium-tin oxide (ITO), indium-gallium-zinc oxide (IGZO), zinc oxide (ZnO), indium-zinc oxide (IZnO), zinc-indium oxide (ZIO), indium oxide (InO), titanium oxide (TiO), indium-zinc-tin oxide (IZTO), zinc-tin oxide (ZTO) or the like.

According to an embodiment of the inventive concept, the gate signal GS may be applied to a gate TF-g of the transistor TF. The gate signal GS may be an AC signal. The gate signal GS may include, within one period PRD, a first sub-interval SSC1 to which a first voltage of −20 V is applied and a second sub-interval SSC2 to which a second voltage of +20 V is applied. The one period may be about 16.67 ms. In the one period PRD, the duty ratio of the second sub-interval SSC2 may be adjusted in various ways, and the description thereof will be described below.

Referring to FIG. 9B, a first graph GP1 is a transfer curve of the transistor TF in an initial state, and a second graph GP2 is a transfer curve of the transistor TF2 in an NBIS environment for a prescribed time, for example, about 4,000 sec.

When comparing the first and second graphs GP1, GP2, it may be confirmed that the transfer curve does not significantly change after the NBIS reliability test, as an AC signal including a voltage of 0 V or greater is applied as the gate signal GS. This is because, at the time of the NBIS reliability test, electrons generated by light or photoexcited holes are injected by a gate field to an insulation film covering the gate to cause a change in the threshold voltage. As shown in the embodiment of the inventive concept, as the gate signal GS with a voltage of about 0 V or higher is provided as the gate signal GS, the direction of the gate field may change to suppress thermal degradation of the transistor TF.

According to the embodiment, as a voltage of 0 V or higher with a prescribed duty ratio is provided to a transistor of which a change amount of the threshold voltage is required to be reduced among the transistors included in the display panel DP (see FIG. 3B), the change amount of threshold voltage may be reduced. As a result, the reliability of the display device DD (see FIG. 3B) may be improved.

In an embodiment of the inventive concept, when the duty ratio of an interval in which a negative voltage is provided in one period of a signal provided to a gate of a transistor is 90% or higher, the transistor may be determined as a transistor of which a change mount of the threshold voltage is required to be reduced, but the embodiment is not limited thereto.

Figure 10A:
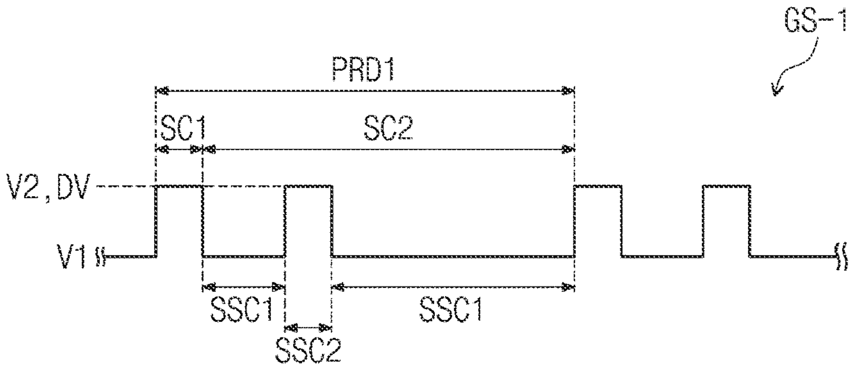
FIG. 10A is a waveform diagram illustrating a gate signal according to an embodiment of the inventive concept.
Figure 10B:
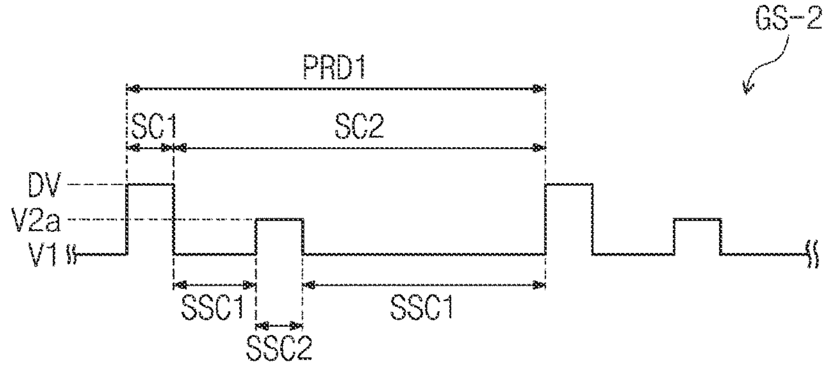
FIG. 10B is a waveform diagram illustrating a gate signal according to an embodiment of the inventive concept.
Figure 10C:
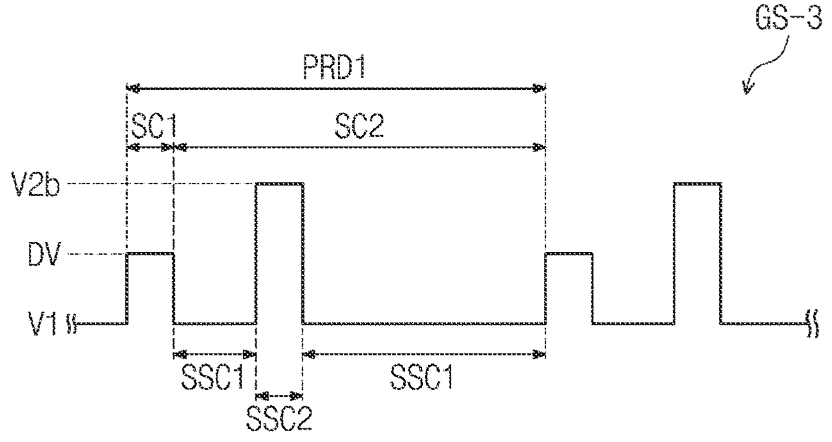
FIG. 10C is a waveform diagram illustrating a gate signal according to an embodiment of the inventive concept.

FIG. 10A is a waveform diagram illustrating a gate signal GS-1 according to an embodiment of the inventive concept. FIG. 10B is a waveform diagram illustrating a gate signal GS-2 according to an embodiment of the inventive concept. FIG. 10C is a waveform diagram illustrating a gate signal GS-3 according to an embodiment of the inventive concept.

Referring to FIGS. 4B, 10A, 10B, and 10C, the gate signal GS-1, GS-2 or GS-3 may be one of signals provided to the pixel circuit PXC. For example, the gate signal GS-1, GS-2 or GS-3 may be one of the initialization scan signal GIi, the compensation scan signal GRi, the write scan signal GWi, and the emission control signal EMi.

The gate signal GS-1, GS-2 or GS-3 may include, in one period PRD1, a first interval SC1 in which a DC signal is applied and a second interval SC2 in which an AC signal is applied. The second interval SC2 may include a first sub-interval SSC1 in which a first voltage V1 is applied and a second sub-interval SSC2 in which a second voltage V2 is applied.

FIGS. 10A, 10B, and 10C illustrates, for example, that the first sub-interval SSC1, the second sub-interval SSC2, and the first sub-interval SSC1 are sequentially repeated, but the embodiment is not particularly limited thereto. For example, the second interval SC2 may include one sub-interval SSC1 and one second sub-interval SSC2. Alternatively, the second interval SC2 may include two sub-intervals SSC2 and one second sub-interval SSC1.

In an embodiment of the inventive concept, the first voltage V1 may be a negative voltage, and the second voltage V2 may be a positive voltage or 0 V. For example, the first voltage V1 may be a low voltage V-LOW.

According to a comparative example of the inventive concept, the entire second interval SC2 may be maintained to the first voltage V1. However, according to an embodiment of the inventive concept, a positive voltage or 0 V may be applied in at least a portion of the second interval SC2. Accordingly, degradation, for example, a change in the threshold voltage may be reduced in or removed from a transistor to which the gate signal GS-1, GS-2, or GS-3 is applied.

In an embodiment of the inventive concept, when the gate signal GS-1, GS-2, or GS-3 is the initialization scan signal GIi, the first interval SC1 may correspond to the initialization interval IP (see FIG. 4B). Alternatively, when the gate signal GS-1, GS-2, or GS-3 is the compensation scan signal GRi, the first interval SC1 may correspond to the compensation interval CP (see FIG. 4B). Alternatively, when the gate signal GS-1, GS-2, or GS-3 is the write scan signal GWi, the first interval SC1 may correspond to the write interval WP (see FIG. 4B). Alternatively, when the gate signal GS-1, GS-2, or GS-3 is the emission control signal EMi, the first interval SC1 may correspond to the compensation interval CP or the emission interval (see FIG. 4B).

Referring to FIGS. 4B and 10A, a voltage DV of a DC signal in the first interval SC1 and a second voltage V2 may be identical to the high voltage V-HIGH, and the first voltage V1 may be identical to the low voltage V-LOW. In this case, the first voltage V1 is a negative voltage, the voltage DV and the second voltage V2 may be about 0 V or a positive voltage. In an embodiment of the inventive concept, the voltage DV and the second voltage V2 may have the same magnitude as the first voltage V1.

Referring to FIGS. 4B and 10B, the voltage DV of a DC signal in the first interval SC1 may be identical to the high voltage V-HIGH, and the first voltage V1 may be identical to the low voltage V-LOW. A second voltage V2*a* may have a level between the first voltage V1 and the voltage DV. In an embodiment of the inventive concept, the first voltage V1 may be a negative voltage, the voltage DV may be a positive voltage, and the second voltage V2 may be about 0 V or a positive voltage.

Referring to FIGS. 4B and 10C, the voltage DV of a DC signal in the first interval SC1 may be identical to the high voltage V-HIGH, and the first voltage V1 may be identical to the low voltage V-LOW. In this case, the first voltage V1 may be a negative voltage, the voltage DV and the second voltage V2*b* may be 0 V or positive voltages. In an embodiment of the inventive concept, the second voltage V2 may have the same magnitude as the first voltage V1, and the second voltage V2 may have a greater magnitude than the voltage DV.

Figure 11A:
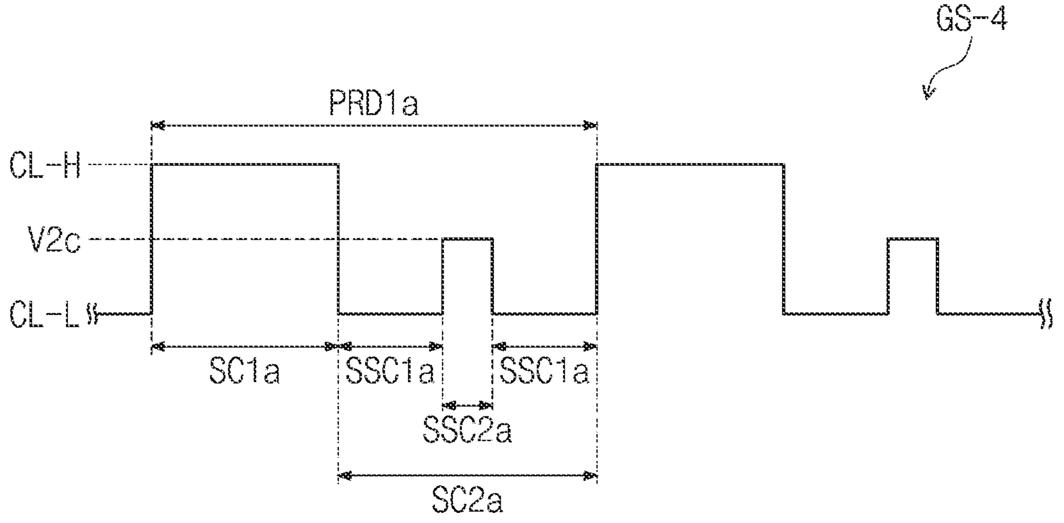
FIG. 11A is a waveform diagram illustrating a gate signal according to an embodiment of the inventive concept.
Figure 11B:
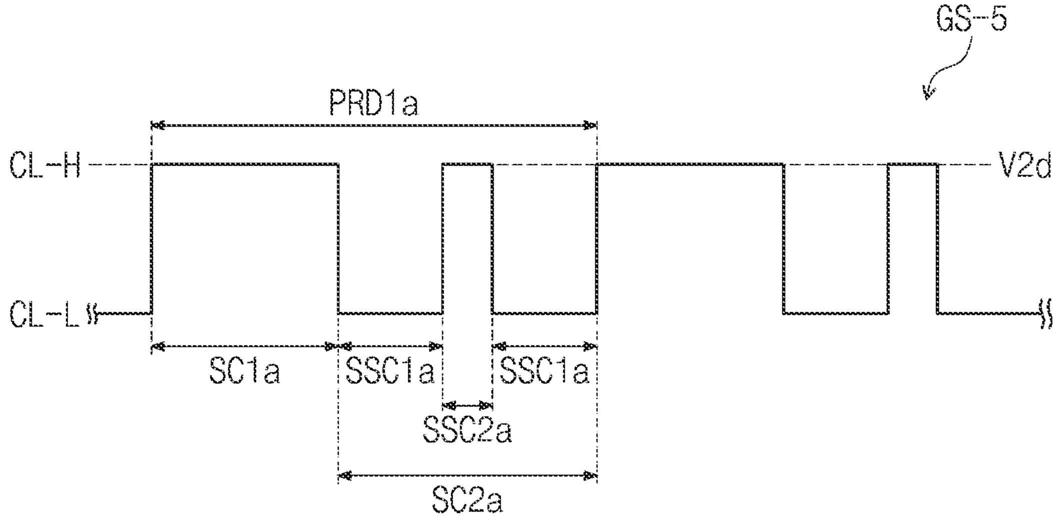
FIG. 11B is a waveform diagram illustrating a gate signal according to an embodiment of the inventive concept.

FIG. 11A is a waveform diagram illustrating a gate signal according to an embodiment of the inventive concept. FIG. 11B is a waveform diagram illustrating a gate signal according to an embodiment of the inventive concept.

Referring to FIGS. 7, 11A, and 11B, a gate signal GS-4 or GS-5 may be one of signals provided to the driving circuit GDC. For example, the gate signal GS-4 or GS-5 may be one of the first clock signal CLK1 and the second clock signal CLK2.

The gate signal GS-4 or GS-5 may include, in one period PRD1*a*, a first interval SC1*a* in which a DC signal is applied and a second interval SC2*a* in which an AC signal is applied. The second interval SC2*a* may include a first sub-interval SSC1*a* in which a first voltage CL-L is applied and a second sub-interval SSC2*a* in which a second voltage V2*c* different from the first voltage CL-L is applied.

According to a comparative example of the inventive concept, the entire second interval SC2*a* may be maintained to the first voltage CL-L. However, according to an embodiment of the inventive concept, a positive voltage or 0 V may be applied in at least a portion of the second interval SC2*a*. Accordingly, degradation, for example, a change in the threshold voltage may be reduced in or removed from a transistor to which the gate signal GS-4 or GS-5 is applied.

Referring to FIGS. 7 and 11A, the first voltage CL-L may be a negative voltage, and a voltage CL-H of a DC signal in the first interval SC1*a* may be a positive voltage. The DC voltage CL-H may have the same magnitude as the first voltage CL-L. The second voltage V2*c* may be 0 V. In other words, 0 V may be applied in at least a portion of the second interval SC2*a*. Accordingly, degradation, for example, a change in the threshold voltage may be reduced in or removed from a transistor to which the gate signal GS-4 or GS-5 is applied.

Referring to FIGS. 7 and 11B, the first voltage CL-L may be a negative voltage, and a voltage CL-H of a DC signal in the first interval SC1*a* may be a positive voltage. The second voltage V2*c* may be identical to the voltage CL-H of a DC signal. Accordingly, each of the second voltage V2*c* and the voltage CL-H of a DC signal may have the same magnitude as the first voltage CL-L. In other words, a positive voltage may be applied in at least a portion of the second interval SC2*a*. Accordingly, degradation, for example, a change in the threshold voltage may be reduced in or removed from a transistor to which the gate signal GS-4 or GS-5 is applied.

Figure 12A:
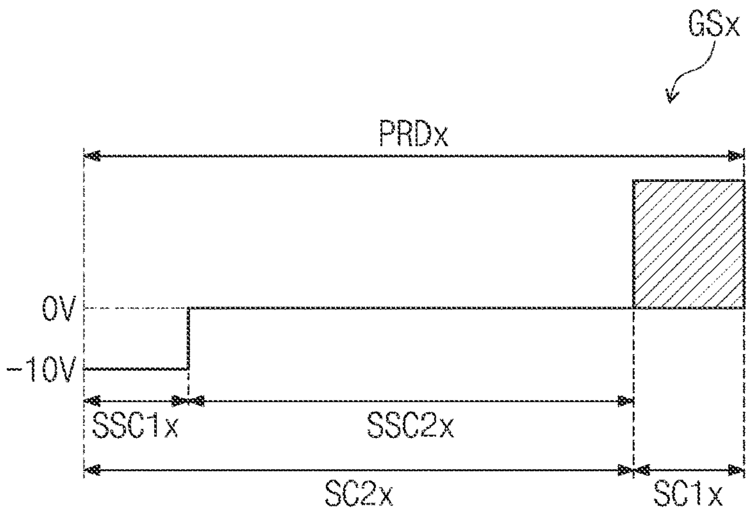
FIG. 12A is a waveform diagram illustrating a gate signal according to an embodiment of the inventive concept.
Figure 12B:
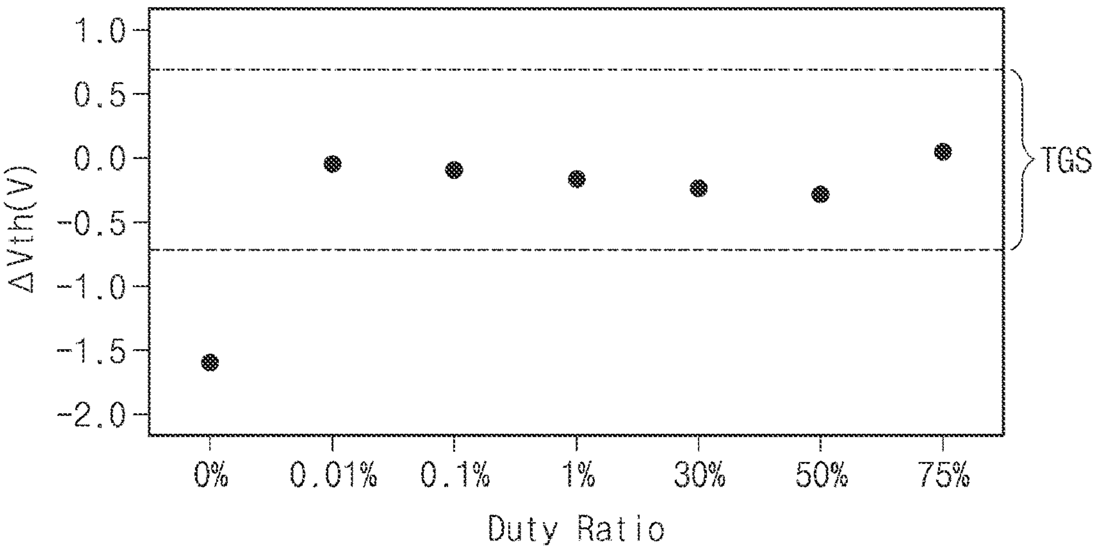
FIG. 12B is a graph showing a change amount of the threshold voltage of a transistor according to the duty ratio of a second sub-interval of the gate signal shown in FIG. 12A.

FIG. 12A is a waveform diagram illustrating a gate signal according to an embodiment of the inventive concept. FIG. 12B is a graph showing a change amount of the threshold voltage of a transistor according to the duty ratio of a second sub-interval of the gate signal shown in FIG. 12A.

Referring to FIGS. 12A and 12B, a gate signal GSx may include, in one period PRD1*x*, a first interval SC1*x* in which a DC signal is applied and a second interval SC2*x* in which an AC signal is applied. The gate signal GSx in the first interval SC1*x* may have a DC voltage greater than 0 V, the range of which not being particularly limited. Accordingly, the first interval SC1*x* is shown in a block type. The second interval SC2*x* may include, for example, a first sub-interval SSC1*x* in which-10 V is applied, and a second sub-interval SSC2*x* in which 0 V is applied.

When the duty ratio of the second sub-interval is about 0, the threshold voltage may move by about −1.58 V to negative voltages. When the duty ratio of the second sub-interval SSC2*x* is about 0.01% to about 75% of one period PRDx, the change amount of the threshold voltage may be within a target range TGS.

Figure 13A:
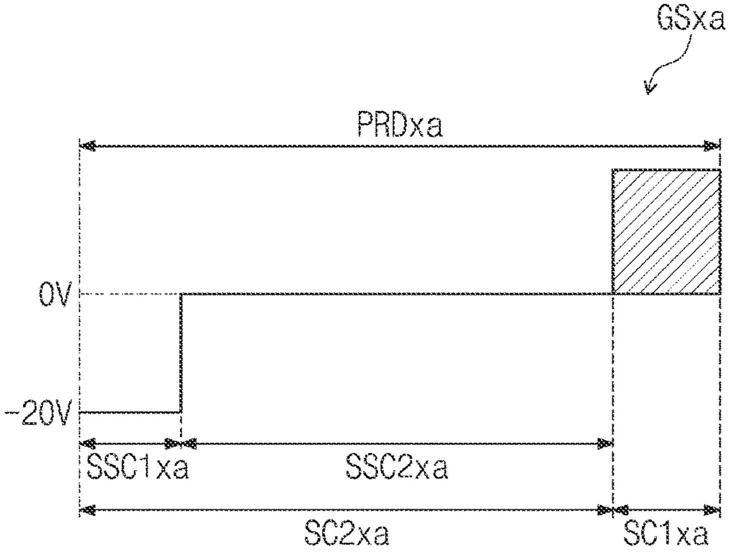
FIG. 13A is a waveform diagram illustrating a gate signal according to an embodiment of the inventive concept.
Figure 13B:
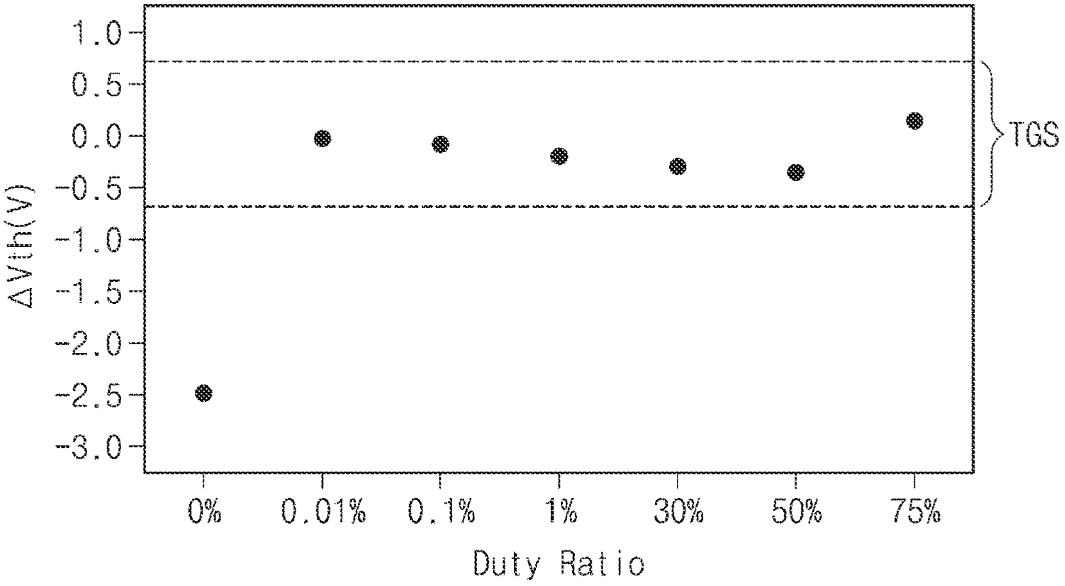
FIG. 13B is a graph showing a change amount of the threshold voltage of a transistor according to the duty ratio of a second sub-interval of the gate signal shown is FIG. 13A.

FIG. 13A is a waveform diagram illustrating a gate signal according to an embodiment of the inventive concept. FIG. 13B is a graph showing a change amount of the threshold voltage of a transistor according to the duty ratio of a second sub-interval of the gate signal shown is FIG. 13A.

Referring to FIGS. 13A and 13B, a gate signal GSxa may include a first interval SC1*xa* in which a positive DC signal is applied and a second interval SC2*xa* in which an AC signal is applied. The second interval SC2*xa* may include a first sub-interval SSC1*xa* in which a negative voltage, for example, about −20 V is applied, and a second sub-interval SSC2*xa* in which about 0 V is applied.

When a duty ratio of the second sub-interval SSC2*xa* is about 0, the threshold voltage may move by about −2.49 V to negative voltages. When the duty ratio of the second sub-interval SSC2*xa* is about 0.01% to about 75% of one period PRDxa, the change amount of the threshold voltage may be within the target range TGS.

Figure 14A:
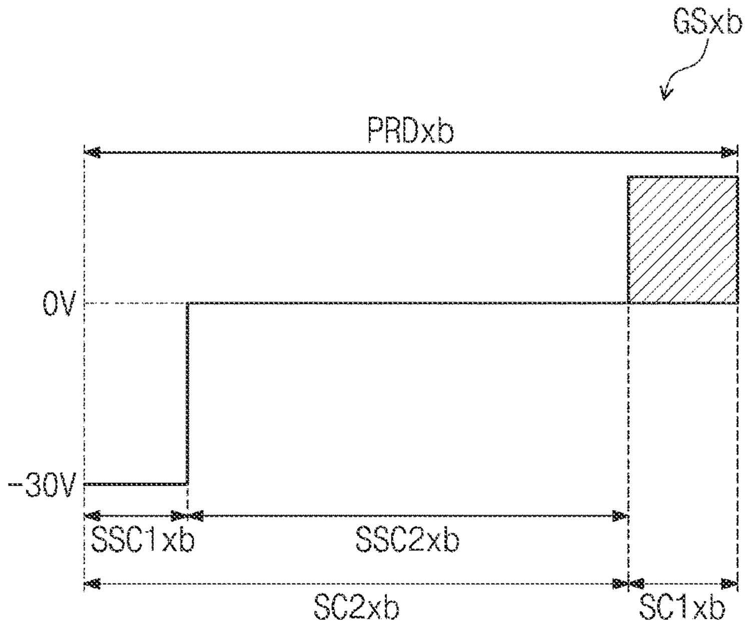
FIG. 14A is a waveform diagram illustrating a gate signal according to an embodiment of the inventive concept.
Figure 14B:
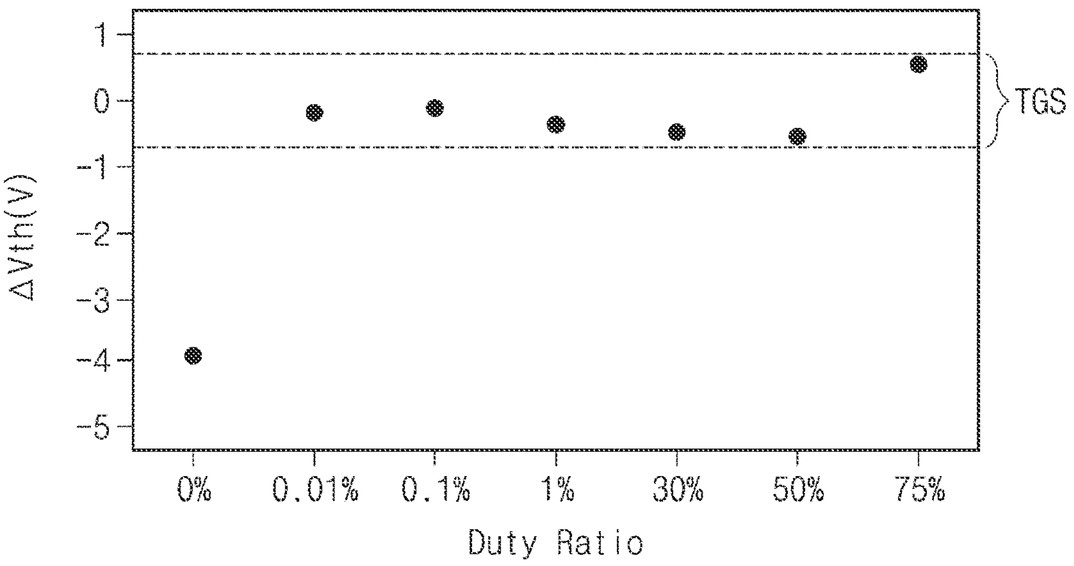
FIG. 14B is a graph showing a change amount of the threshold voltage of a transistor according to the duty ratio of a second sub-interval of the gate signal shown in FIG. 14A.

FIG. 14A is a waveform diagram illustrating a gate signal according to an embodiment of the inventive concept. FIG. 14B is a graph showing a change amount of the threshold voltage of a transistor according to the duty ratio of a second sub-interval of the gate signal shown in FIG. 14A.

Referring to FIGS. 14A and 14B, a gate signal GSxb may include a first interval SC1*xb* in which a positive DC signal is applied and a second interval SC2*xb* in which an AC signal is applied. The second interval SC2*xb* may include a first sub-interval SSC1*xb* in which a negative voltage, for example, about −30 V is applied, and a second sub-interval SSC2*xb* in which about 0 V is applied.

When the duty ratio of the second sub-interval SSC2*xb* is about 0, the threshold voltage may move by about −3.9059 V to negative voltages. When the duty ratio of the second sub-interval SSC2*xb* is about 0.01% to about 75% of one period PRDxb, the change amount of the threshold voltage may be within the target range TGS.

According to the embodiment of the inventive concept, as a voltage of about 0 V or higher with a prescribed duty ratio is provided to a transistor of which a change amount of the threshold voltage is required to be reduced among the transistors included in the display panel DP (see FIG. 3B), the change amount of the threshold voltage may be reduced. For example, as described with reference to FIGS. 12A to 14B, when the first voltage is about −34V to about −10V and the second voltage is about 0V, the duty ratios of the second sub-intervals SSC2*x*, SSC2*xa*, SSC2*xb* may be about 0.01% to about 75%. In this case, a change amount of the threshold voltage of the transistor may be in the target range TGS. As a result, the reliability of the display device DD (see FIG. 3B) may be improved.

Figure 15A:
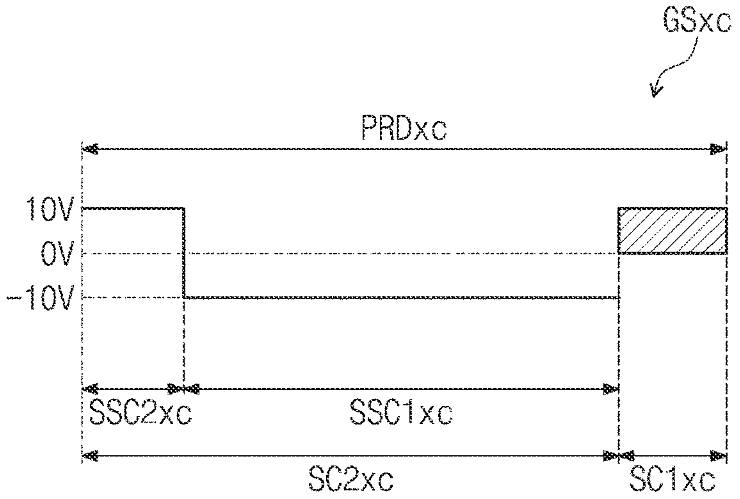
FIG. 15A is a waveform diagram illustrating a gate signal according to an embodiment of the inventive concept.
Figure 15B:
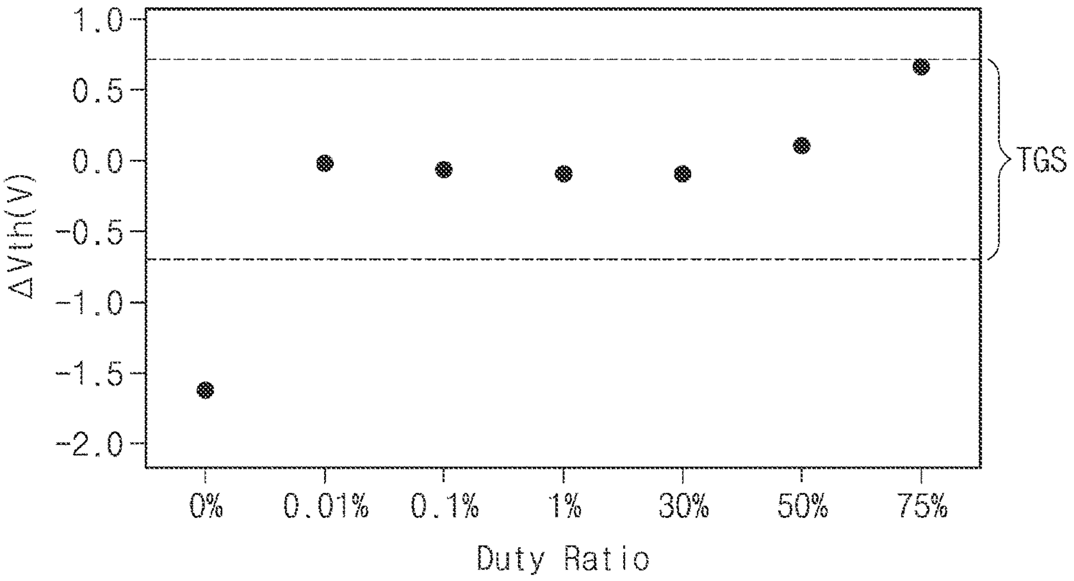
FIG. 15B is a graph showing a change amount of the threshold voltage of a transistor according to the duty ratio of a second sub-interval of the gate signal shown is FIG. 15A.

FIG. 15A is a waveform diagram illustrating a gate signal according to an embodiment of the inventive concept. FIG. 15B is a graph showing a change amount of a threshold voltage of a transistor according to a duty ratio of a second sub-interval of the gate signal shown is FIG. 15A.

Referring to FIGS. 15A and 15B, a gate signal GSxc may include a first interval SC1*xc* in which a positive DC signal is applied and a second interval SC2*xc* in which an AC signal is applied. The second interval SC2*xc* may include a first sub-interval SSC1*xc* in which about −10 V is applied, and a second sub-interval SSC2*xc* in which about +10 V is applied.

When the duty ratio of the second sub-interval is about 0, the threshold voltage may move by about −1.58 V to negative voltages. When the duty ratio of the second sub-interval SSC2*xc* is about 0.01% to about 50% of one period PRDxc, a change amount of the threshold voltage may be within the target range TGS.

Figure 16A:
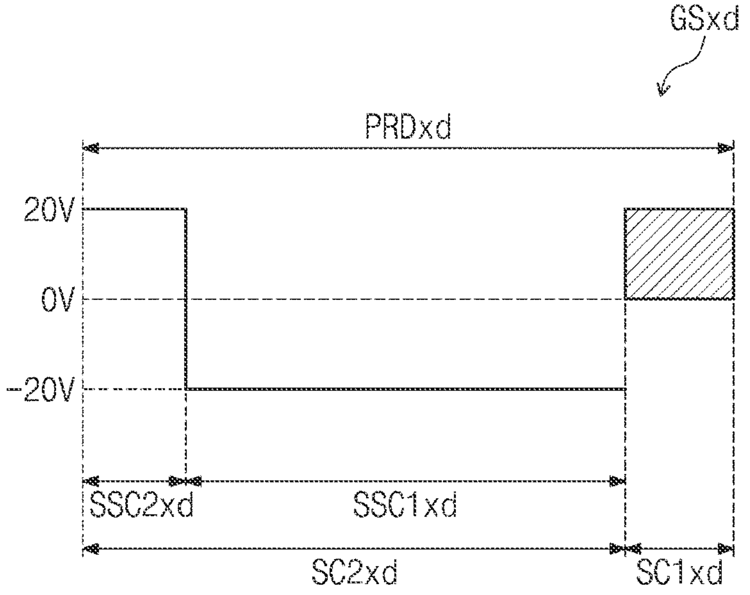
FIG. 16A is a waveform diagram illustrating a gate signal according to an embodiment of the inventive concept.
Figure 16B:
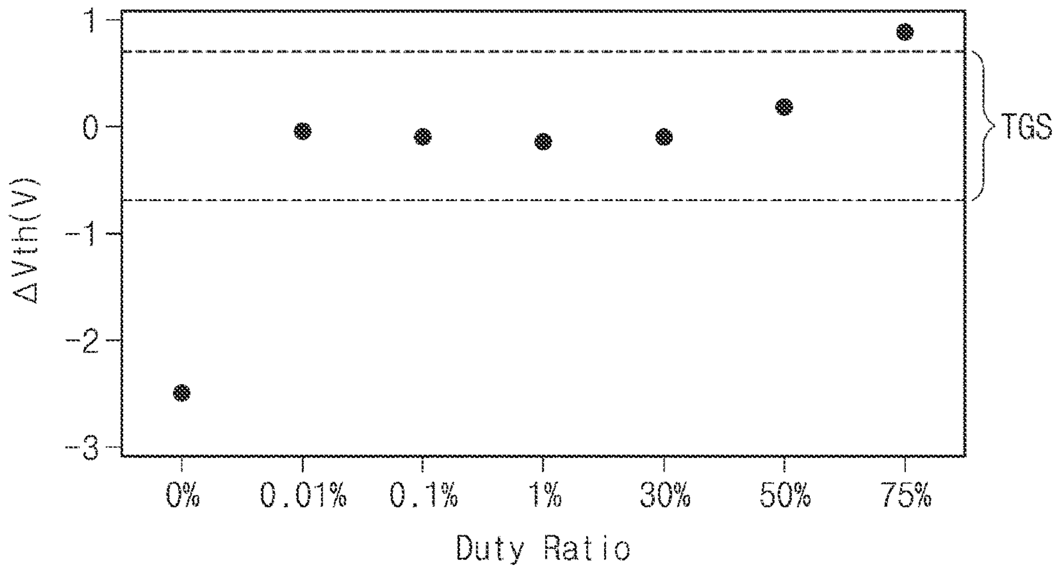
FIG. 16B is a graph showing a change amount of the threshold voltage of a transistor according to the duty ratio of a second sub-interval of the gate signal shown in FIG. 16A.

FIG. 16A is a waveform diagram illustrating a gate signal according to an embodiment of the inventive concept. FIG. 16B is a graph showing a change amount of the threshold voltage of a transistor according to the duty ratio of a second sub-interval of the gate signal shown in FIG. 16A.

Referring to FIGS. 16A and 16B, a gate signal GSxd may include a first interval SC1*xd* in which a positive DC signal is applied and a second interval SC2*xd* in which an AC signal is applied. The second interval SC2*xd* may include, for example, a first sub-interval SSC1*xd* in which a negative voltage about −20 V is applied, and a second sub-interval SSC2*xd* in which about +20 V is applied.

When the duty ratio of the second sub-interval SSC2*xd* is about 0.01% to about 50% of one period PRDxd, a change amount of the threshold voltage may be within the target range TGS. When the duty ratio of the second sub-interval SSC2*xd* is about 0, the threshold voltage may move by about −2.49 V to negative voltages.

Figure 17A:
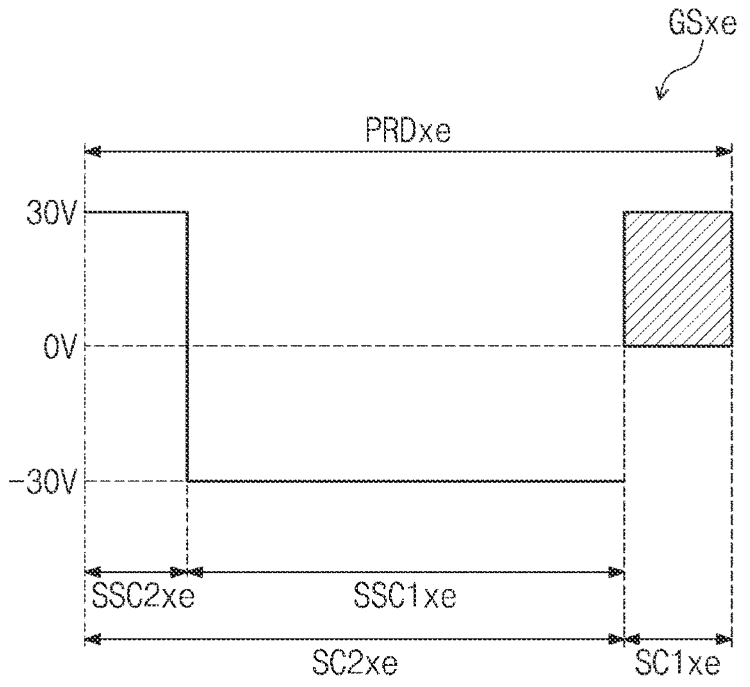
FIG. 17A is a waveform diagram illustrating a gate signal according to an embodiment of the inventive concept.
Figure 17B:
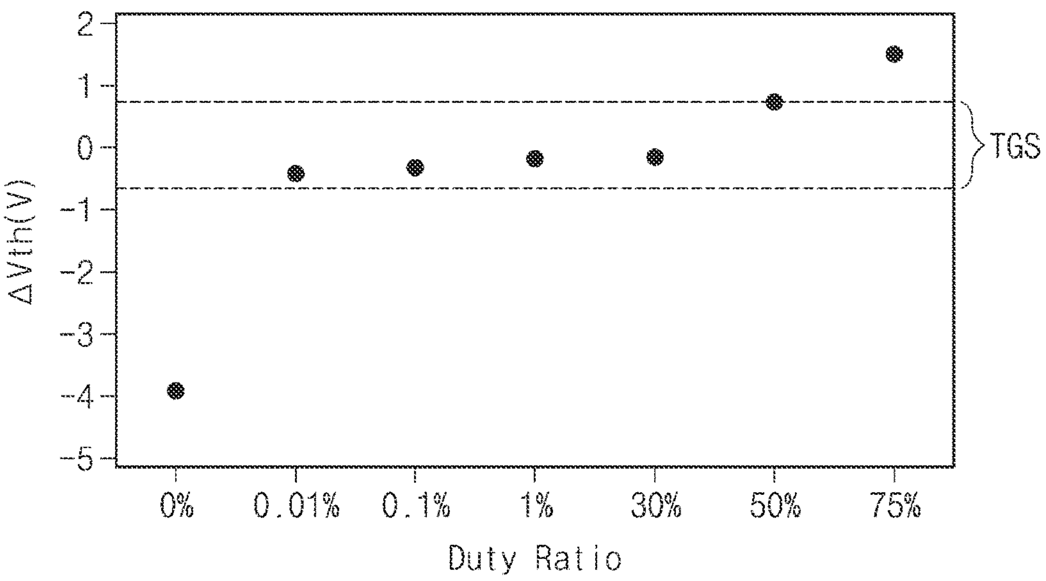
FIG. 17B is a graph showing a change amount of the threshold voltage of a transistor according to the duty ratio of a second sub-interval of the gate signal shown is FIG. 17A.

FIG. 17A is a waveform diagram illustrating a gate signal according to an embodiment of the inventive concept. FIG. 17B is a graph showing a change amount of a threshold voltage of a transistor according to the duty ratio of a second sub-interval of the gate signal shown is FIG. 17A.

Referring to FIGS. 17A and 17B, a gate signal GSxe may include a first interval SC1*xe* in which a positive DC signal is applied and a second interval SC2*xe* in which an AC signal is applied. The second interval SC2*xe* may include, for example, a first sub-interval SSC1*xe* in which a negative voltage about −30 V is applied, and a second sub-interval SSC2*xe* in which about +30 V is applied.

When the duty ratio of the second sub-interval SSC2*xe* is about 0.01% to about 30% of one period PRDxe, a change amount of the threshold voltage may be within the target range TGS.

According to the embodiment of the inventive concept, as a positive voltage having the same magnitude as a negative voltage is applied with a prescribed duty ratio, the negative voltage being provided to a transistor of which a change amount of the threshold voltage is required to be reduced among the transistors included in the display panel DP (see FIG. 3B), the change amount of the threshold voltage may be reduced. For example, as described with reference to FIGS. 15A to 16B, when the first voltage is about −20 V to about −10 V and the second voltage has the same magnitude as the first voltage, the duty ratio of the second sub-interval is about 0.01% to about 50%. Alternatively, as described with reference to FIGS. 16A to 17B, when the first voltage is about −30V or higher and smaller than about −20V and the second voltage has the same magnitude as the first voltage, the duty ratio of the second sub-interval is about 0.01% to about 30%. In this case, the change amount of the threshold voltage of the transistor may be in the target range TGS. As a result, the reliability of the display device DD (see FIG. 3B) may be improved.

According to the aforementioned description, a gate signal is provided to at least one transistor included in the display panel. The gate signal may include an AC signal including a voltage of about 0 V or higher. In this case, a change amount of the threshold voltage of the transistor may be reduced by the gate signal. As a result, the reliability of the display device may be improved.

Although embodiments of the present inventive concepts have been described, various modifications and similar arrangements of such embodiments will be apparent to a person of ordinary skill in the art. Accordingly, the inventive concepts are not limited to such embodiments, but rather to the scope and spirit of the appended claims.

What is claimed is:

1. A display device comprising:

a pixel circuit comprising a plurality of pixel transistors;

a light emitting element electrically connected to the pixel circuit; and a driving circuit configured to provide a prescribed signal to the pixel circuit, and comprising a plurality of driving transistors, wherein a gate signal is applied to a gate of at least one transistor among the plurality of pixel transistors and the plurality of driving transistors, the gate signal comprises a first interval in which a DC signal is applied and a second interval in which an AC signal is applied, the second interval comprises a first sub-interval in which a first voltage is applied and a second sub-interval in which a second voltage different from the first voltage is applied, and the first voltage is a negative voltage and the second voltage is a positive voltage or about 0 V.

2. The display device of claim 1, wherein the driving circuit comprises a plurality of driving stages, the plurality of driving stages each comprising a clock terminal configured to receive a clock signal and an output terminal configured to output a signal to the pixel circuit, and the at least one transistor is electrically connected to the clock terminal to receive the clock signal, and the clock signal is the gate signal.

3. The display device of claim 2, wherein a voltage of the DC signal is a positive voltage having a same magnitude as the first voltage, and the second voltage is about 0 V.

4. The display device of claim 1, wherein the pixel circuit is electrically connected to an initialization scan line, a compensation scan line, a write scan line, and an emission signal line, and the driving circuit provides an initialization scan signal to the initialization scan line, a compensation scan signal to the compensation scan line, a write scan signal to the write scan line, and an emission control signal to the emission signal line.

5. The display device of claim 4, wherein the gate signal is one of the initialization scan signal, the compensation scan signal, the write scan signal, and the emission control signal.

6. The display device of claim 1, wherein a voltage of the DC signal is a positive voltage having a same magnitude as the first voltage.

7. The display device of claim 1, wherein a duty ratio of the second interval is about 90% or greater.

8. The display device of claim 1, wherein the at least one transistor is an oxide thin-film transistor.

9. The display device of claim 1, wherein the at least one transistor is an amorphous indium-gallium-zinc oxide transistor.

10. The display device of claim 1, wherein the at least one transistor is an N-type thin-film transistor.

11. The display device of claim 1, wherein, when the second voltage is about 0 V, a duty ratio of the second sub-interval is about 0.01% to about 75%.

12. The display device of claim 1, wherein, when the first voltage is about −20 V to about −10 V and the second voltage is a positive voltage having a same magnitude as the first voltage, a duty ratio of the second sub-interval is about 0.01% to about 50%.

13. The display device of claim 1, wherein, when the first voltage is about −30V or higher and smaller than about −20V and the second voltage is a positive voltage having a same magnitude as the first voltage, a duty ratio of the second sub-interval is about 0.01% to about 30%.

14. An electronic device comprising comprising:

a pixel circuit comprising a plurality of pixel transistors;

a light emitting element electrically connected to the pixel circuit;

scan lines comprising an initialization scan line, a compensation scan line, and a write scan line that are electrically connected to the pixel circuit; and a driving circuit configured to provide a prescribed signal to the pixel circuit, and comprising a plurality of driving transistors, wherein a gate signal is applied to a gate of an oxide thin-film transistor among the plurality of pixel transistors and the plurality of driving transistors, the gate signal comprises a first interval in which a DC signal is applied and a second interval in which an AC signal is applied, the second interval comprises a first sub-interval in which a first voltage is applied and a second sub-interval in which a second voltage different from the first voltage is applied, and a duty ratio of the second sub-interval is about 0.01% to about 75%.

15. The electronic device of claim 14, wherein the driving circuit comprises a plurality of driving stages, the plurality of driving stages each comprising a clock terminal configured to receive a clock signal and an output terminal configured to output a signal to the pixel circuit, and the oxide thin-film transistor is electrically connected to the clock terminal to receive the clock signal, and the clock signal is the gate signal.

16. The electronic device of claim 14, further comprising an emission signal line that is electrically connected to the pixel circuit, wherein the driving circuit provides an initialization scan signal to the initialization scan line, a compensation scan signal to the compensation scan line, a write scan signal to the write scan line, and an emission control signal to the emission signal line, and the gate signal is one of the initialization scan signal, the compensation scan signal, the write scan signal, and the emission control signal.

17. The electronic device of claim 14, wherein, when the first voltage is about −30 V to about −10 V and the second voltage is about 0 V, a duty ratio of the second sub-interval is about 0.01% to about 75%.

18. The electronic device of claim 14, wherein, when the first voltage is about −20 V to about −10 V and the second voltage is a positive voltage having a same magnitude as the first voltage, a duty ratio of the second sub-interval is about 0.01% to about 50%.

19. The electronic device of claim 14, wherein, when the first voltage is about −30V or higher and smaller than about −20V and the second voltage is a positive voltage having a same magnitude as the first voltage, a duty ratio of the second sub-interval is about 0.01% to about 30%.

20. The electronic device of claim 14, wherein the oxide thin-film transistor is an N-type thin-film transistor.

* * * * *